(12) United States Patent
Rice

(10) Patent No.: US 11,046,288 B2
(45) Date of Patent: *Jun. 29, 2021

(54) NOZZLES AND SYSTEMS FOR CLEANING VEHICLE SENSORS

(71) Applicant: UATC, LLC, San Francisco, CA (US)

(72) Inventor: Wesly Mason Rice, Glenshaw, PA (US)

(73) Assignee: UATC, LLC, Mountain View, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 16/142,485

(22) Filed: Sep. 26, 2018

(65) Prior Publication Data

US 2019/0135240 A1 May 9, 2019

Related U.S. Application Data

(63) Continuation of application No. 15/839,100, filed on Dec. 12, 2017, now Pat. No. 10,144,394.

(60) Provisional application No. 62/583,143, filed on Nov. 8, 2017.

(51) Int. Cl.
| | | |
|---|---|---|
| *B60S 1/52* | (2006.01) | |
| *B60S 1/56* | (2006.01) | |
| *B05B 1/08* | (2006.01) | |
| *B08B 3/02* | (2006.01) | |
| *B60S 1/48* | (2006.01) | |
| *B05B 9/03* | (2006.01) | |

(52) U.S. Cl.
CPC ............... *B60S 1/522* (2013.01); *B05B 1/08* (2013.01); *B05B 9/035* (2013.01); *B08B 3/02* (2013.01); *B60S 1/481* (2013.01); *B60S 1/52* (2013.01); *B60S 1/56* (2013.01)

(58) Field of Classification Search
CPC .. B60S 1/522; B60S 1/481; B60S 1/52; B60S 1/56; B60B 1/08; B60B 3/02; B05B 9/035

See application file for complete search history.

(56) References Cited

U.S. PATENT DOCUMENTS

| | | | |
|---|---|---|---|
| 4,508,267 A * | 4/1985 | Stouffer | ................... B05B 1/08 137/835 |
| 6,240,945 B1 | 6/2001 | Srinath | |
| 6,805,164 B2 | 10/2004 | Stouffer | |

(Continued)

*Primary Examiner* — Dung Van Nguyen
(74) *Attorney, Agent, or Firm* — Dority & Manning, P A.

(57) ABSTRACT

Nozzles and systems for cleaning sensors of a vehicle are provided. An adjustable nozzle can include an inlet configured to receive a pressurized fluid, an adjustable oscillator coupled with the inlet, and an outlet coupled with the adjustable oscillator. The adjustable oscillator can be configured to receive the pressurized fluid from the inlet and generate an oscillating fluid, and can include a first oscillation wall comprising a first adjustable chamber modifier wall and a second oscillation wall comprising a second adjustable chamber modifier wall. The first adjustable chamber modifier wall and the second adjustable chamber modifier wall can define an adjustable mixing chamber configured to generate the oscillating fluid having one or more properties that are adjustable by the first adjustable chamber modifier wall or the second adjustable chamber modifier wall. The outlet can be configured to receive the oscillating fluid and eject the oscillating fluid from the adjustable nozzle.

20 Claims, 8 Drawing Sheets

(56) References Cited

U.S. PATENT DOCUMENTS

| | | | |
|---|---|---|---|
| 6,976,507 B1 * | 12/2005 | Webb | F15B 21/12 |
| | | | 137/826 |
| 8,297,540 B1 | 10/2012 | Vijay | |
| 8,702,020 B2 | 4/2014 | Gopalan | |
| 9,168,540 B2 | 10/2015 | Zhou | |
| 10,144,394 B1 * | 12/2018 | Rice | B60S 1/56 |
| 2005/0252539 A1 | 11/2005 | Maruyama | |
| 2011/0061692 A1 | 3/2011 | Gopalan | |
| 2011/0073142 A1 | 3/2011 | Hattori | |
| 2011/0292212 A1 | 12/2011 | Tanabe | |
| 2015/0138357 A1 | 5/2015 | Romack | |
| 2016/0176384 A1 * | 6/2016 | Dissette | G01S 13/931 |
| | | | 134/34 |
| 2018/0009418 A1 | 1/2018 | Newman | |

\* cited by examiner

NOZZLES AND SYSTEMS FOR CLEANING VEHICLE SENSORS

PRIORITY CLAIM

The present application is continuation of U.S. application Ser. No. 15/839,100 having a filing date of Dec. 12, 2017. The present application is further based on and claims benefit of U.S. Provisional Application 62/583,143 having a filing date of Nov. 8, 2017. Applicant claims priority to and benefit of all such applications and incorporates all such applications herein by reference.

FIELD

The present disclosure relates generally to nozzles for cleaning sensors of a vehicle using a pressurized fluid.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on sensor data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and/or determine other information about the autonomous vehicle and its relationship to the surrounding environment. One aspect such an objective is the collection of sensor data by the variety of sensors included in or otherwise coupled to the vehicle.

However, autonomous vehicle sensors can suffer from the presence of precipitation, debris, contaminants, or environmental objects which interfere with the ability of the sensor to collect the sensor data. As one example, rain, snow, frost, or other weather-related conditions can degrade the quality of the sensor data collected by a given sensor when present. For example, raindrops, snow, or other condensation can collect on the lens or other components of a sensor (e.g., a camera or a Light Detection and Ranging (LIDAR) sensor), thereby degrading the quality of the sensor data collected by the sensor. As another example, dirt, dust, road salt, organic matter (e.g., "bug splatter," pollen, bird droppings, etc.), or other contaminants can accumulate on or adhere to a given sensor (e.g., on the sensor cover, housing, or other external component of the sensor), thereby degrading the quality of the sensor data collected by the sensor.

SUMMARY

Aspects and advantages of embodiments of the present disclosure will be set forth in part in the following description, or can be learned from the description, or can be learned through practice of the embodiments.

One example aspect of the present disclosure is directed to a nozzle for a cleaning system. The nozzle can include an inlet configured to receive a high pressure fluid. The nozzle can further include an oscillator coupled with the inlet. The oscillator can be configured to receive the high pressure fluid from the inlet and generate an oscillating fluid. The nozzle can further include an outlet coupled with the oscillator. The outlet can be configured to receive the oscillating fluid and provide the oscillating fluid to a surface to delaminate debris from the surface. The inlet can provide an unimpeded path of fluid flow to the oscillator.

Another example aspect of the present disclosure is directed to a cleaning system for a sensor. The sensor can include a surface. The cleaning system can include a source of high pressure fluid. The high pressure fluid can be a fluid at a pressure greater than 4.8 bar. The cleaning system can further include a nozzle. The nozzle can include an inlet configured to receive a high pressure fluid from the source of high pressure fluid. The nozzle can further include an oscillator coupled with the inlet. The oscillator can be configured to receive the high pressure fluid from the inlet and generate an oscillating fluid. The nozzle can further include an outlet coupled with the oscillator. The outlet can be configured to receive the oscillating fluid and provide the oscillating fluid to the surface to delaminate debris from the surface.

Another example aspect of the present disclosure is directed to an autonomous vehicle. The autonomous vehicle can include a sensor comprising a surface and a cleaning system. The cleaning system can include a source of high pressure fluid. The high pressure fluid can be a fluid at a pressure greater than 4.8 bar. The cleaning system can further include a flow control device coupled with the source of high pressure fluid. The cleaning system can further include a controller configured to control operation of the flow control device. The cleaning system can further include a nozzle. The nozzle can include an inlet configured to receive a high pressure fluid from the source of high pressure fluid. The nozzle can further include an oscillator coupled with the inlet. The oscillator can be configured to receive the high pressure fluid from the inlet and generate an oscillating fluid. The nozzle can further include an outlet coupled with the oscillator. The outlet can be configured to receive the oscillating fluid and provide the oscillating fluid to the surface to delaminate debris from the surface. The flow control device can be configured to allow or impede a flow of the high pressure fluid from the source of high pressure fluid to the nozzle.

Another example aspect of the present disclosure is directed to an adjustable nozzle. The adjustable nozzle can include an inlet configured to receive a pressurized fluid. The adjustable nozzle can further include an adjustable oscillator coupled with the inlet. The adjustable oscillator can be configured to receive the pressurized fluid from the inlet and generate an oscillating fluid. The adjustable oscillator can include a first oscillation wall comprising a first adjustable chamber modifier wall. The adjustable oscillator can further include a second oscillation wall comprising a second adjustable chamber modifier wall. The first adjustable chamber modifier wall and the second adjustable chamber modifier wall can define an adjustable mixing chamber configured to generate the oscillating fluid having one or more properties that are adjustable by the first adjustable chamber modifier wall or the second adjustable chamber modifier wall. The adjustable nozzle can further include an outlet coupled with the adjustable oscillator. The outlet can be configured to receive the oscillating fluid and eject the oscillating fluid from the adjustable nozzle.

Another example aspect of the present disclosure is directed to a cleaning system. The cleaning system can include a source of pressurized fluid and an adjustable nozzle. The adjustable nozzle can include an inlet configured to receive a pressurized fluid. The adjustable nozzle can further include an adjustable oscillator coupled with the inlet. The adjustable oscillator can be configured to receive the pressurized fluid from the inlet and generate an oscillating fluid. The adjustable oscillator can include a first oscillation wall comprising a first adjustable chamber modifier wall. The adjustable oscillator can further include a second oscillation wall comprising a second adjustable chamber modifier wall. The first adjustable chamber modifier wall and the second adjustable chamber modifier wall can define an adjustable mixing chamber configured to generate the oscillating fluid having one or more properties that are adjustable by the first adjustable chamber modifier wall or the second adjustable chamber modifier wall. The adjustable nozzle can further include an outlet coupled with the adjustable oscillator. The outlet can be configured to receive the oscillating fluid and eject the oscillating fluid from the adjustable nozzle.

Another example aspect of the present disclosure is directed to an autonomous vehicle. The autonomous vehicle can include a sensor comprising a surface and a cleaning system. The cleaning system can include a source of high pressure fluid, a controller, and an adjustable nozzle. The adjustable nozzle can include an inlet configured to receive a pressurized fluid. The adjustable nozzle can further include an adjustable oscillator coupled with the inlet. The adjustable oscillator can be configured to receive the pressurized fluid from the inlet and generate an oscillating fluid. The adjustable oscillator can include a first oscillation wall comprising a first adjustable chamber modifier wall. The adjustable oscillator can further include a second oscillation wall comprising a second adjustable chamber modifier wall. The first adjustable chamber modifier wall and the second adjustable chamber modifier wall can define an adjustable mixing chamber configured to generate the oscillating fluid having one or more properties that are adjustable by the first adjustable chamber modifier wall or the second adjustable chamber modifier wall. The adjustable nozzle can further include an outlet coupled with the adjustable oscillator. The outlet can be configured to receive the oscillating fluid and eject the oscillating fluid from the adjustable nozzle. The one or more properties can include at least one of an oscillation frequency, an oscillation angle, or a direction of a flow of the oscillating fluid. The controller can be configured to control the adjustable nozzle to eject the oscillating fluid onto the surface to delaminate debris from the surface.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
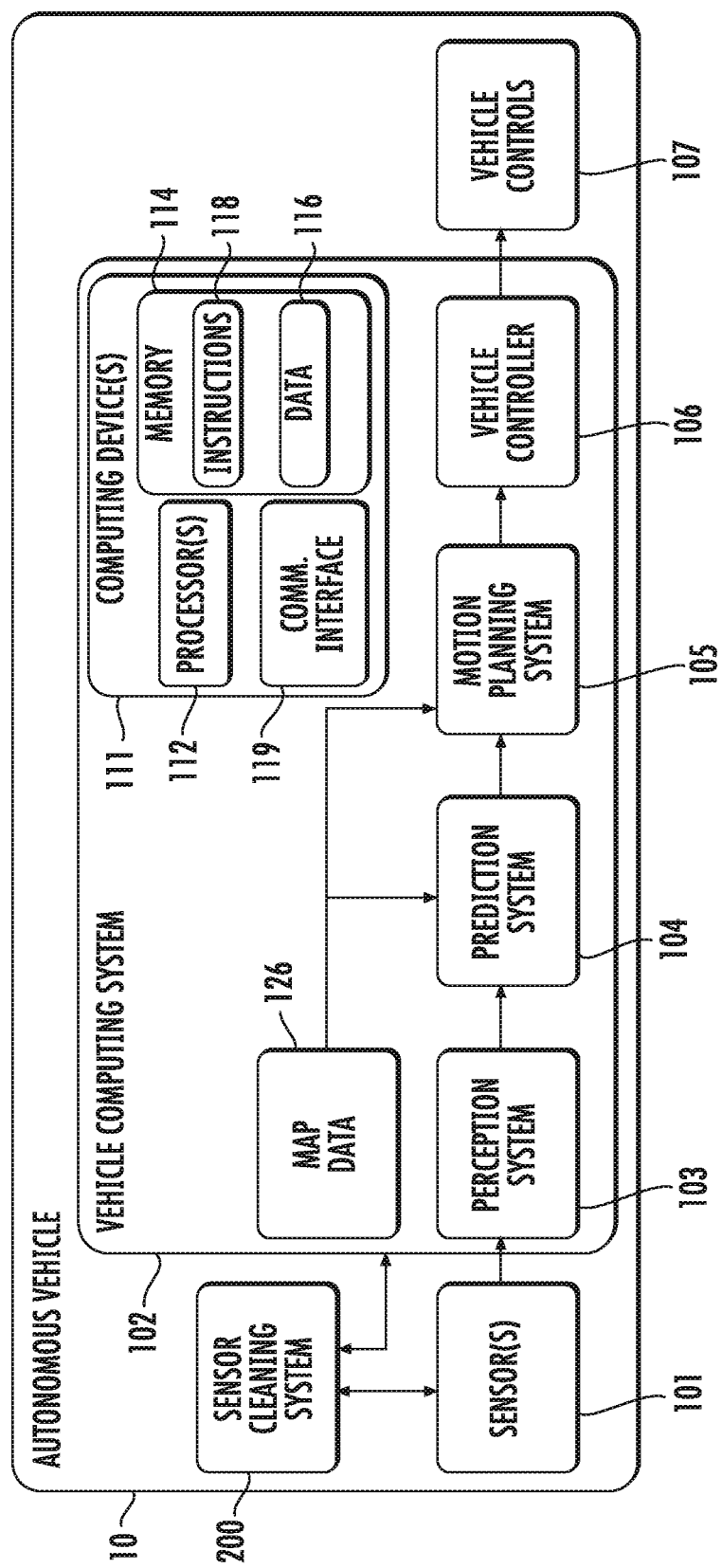
FIG. 1 depicts a block diagram of an example autonomous vehicle according to example embodiments of the present disclosure.

Example aspects of the present disclosure are directed to nozzles and systems for cleaning sensors of an autonomous vehicle. For example, the nozzles of the present disclosure can include an inlet configured to receive a pressurized fluid (e.g., a high pressure fluid). The pressurized fluid can be, for example, a liquid fluid at a pressure greater than 4.8 bar. The nozzle can further include an oscillator coupled with the inlet. The oscillator can be configured to receive the pressurized fluid from the inlet and generate an oscillating fluid. For example, the oscillating fluid can oscillate at a particular frequency, such as, for example, 100 Hz. The nozzle can further include an outlet coupled with the oscillator. The outlet can be configured to receive the oscillating fluid and provide the oscillating fluid to a surface to delaminate debris from the surface. For example, the surface can be a surface of a sensor of an autonomous vehicle, and the nozzle can be positioned to allow for the oscillating fluid to delaminate debris from the surface of the sensor. The inlet can provide an unimpeded path of fluid to the oscillator. For example, the inlet can be free from obstructions, such as posts configured to widen the oscillating fluid generated by the oscillator.

In some implementations, the nozzle can be included in a cleaning system. For example, a cleaning system can include a source of high pressure fluid. For example, in some implementations, the source of high pressure fluid can include a pressurized tank. In some implementations, the fluid can be provided to the pressurized tank from a fluid reservoir, and the pressurized tank can be pressurized by a gas, such as air from a compressor. In some implementations, the fluid can be pressurized at a pressure greater than 4.8 bar. In some implementations, the cleaning system can include a flow control device (e.g., a valve, solenoid, etc.) in fluid communication with the source of high pressure fluid and the nozzle. For example, the flow control device can be coupled between the source of high pressure fluid and the nozzle. The flow control device can be configured to allow or impede a flow of high pressure fluid from the source of high pressure fluid (e.g., a pressurized tank) to the nozzle. For example, in some implementations, the flow control device can be a valve or a solenoid. In some implementations, the cleaning system can further include a controller configured to control operation of the flow control device. For example, the controller can be configured to open or close the flow control device to allow the high pressure fluid to flow from the source of high pressure fluid (e.g., a pressurized tank) to the nozzle. The nozzle can receive the high pressure fluid, and provide an oscillating fluid to a surface, such as a surface of a sensor, in order to delaminate debris from the sensor.

According to additional aspects of the present disclosure, in some implementations, the nozzle can be an adjustable nozzle. The adjustable nozzle can include an inlet configured to receive a pressurized fluid, and an adjustable oscillator configured to receive the pressurized fluid from the inlet and generate an oscillating fluid. The adjustable oscillator can include a first oscillation wall and a second oscillation wall, which can include a first adjustable chamber modifier wall and second adjustable chamber modifier wall, respectively. The first adjustable chamber modifier wall and the second adjustable chamber modifier wall can define an adjustable mixing chamber configured to generate the oscillating fluid have one or more properties that are adjustable by the first adjustable chamber modifier wall and the second adjustable chamber modifier wall. For example, in some implementations, the first adjustable chamber modifier wall and the second adjustable chamber modifier wall can be adjusted so as to adjust an oscillation frequency, an oscillation angle, and/or a direction of a flow of the oscillating fluid. In this way, the nozzles and systems of the present disclosure can allow for a high pressure fluid to be used to generate an oscillating fluid to delaminate debris from a sensor of an autonomous vehicle.

More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle computing system that assists in controlling the autonomous vehicle. In particular, in some implementations, the vehicle computing system can receive sensor data from one or more sensors that are coupled to or otherwise included within the autonomous vehicle. As examples, the one or more sensors can include one or more LIDAR sensors, one or more RADAR sensors, one or more cameras (e.g., visible spectrum cameras, infrared cameras, etc.), and/or other sensors. The sensor data can include information that describes the location of objects within the surrounding environment of the autonomous vehicle.

In some implementations, the sensors can be located at various different locations on the autonomous vehicle. As an example, in some implementations, one or more cameras and/or LIDAR sensors can be located in a pod or other structure that is mounted on a roof of the autonomous vehicle while one or more RADAR sensors can be located in or behind the front and/or rear bumper(s) or body panel(s) of the autonomous vehicle. As another example, camera(s) can be located at the front or rear bumper(s) of the vehicle as well. Other locations can be used as well.

The autonomous vehicle can include a cleaning system that cleans the one or more sensors of an autonomous vehicle, such as a fluid cleaning system (e.g., a gas or a liquid). For example, the sensor cleaning system can include a gas cleaning system that cleans the sensors using a gas (e.g., compressed air); a liquid cleaning system that cleans the sensors using a liquid (e.g., windshield washer fluid); or both a gas cleaning system and a liquid cleaning system.

In particular, in some implementations, the cleaning system can include one or more nozzles that are configured to respectively clean one or more sensors of the autonomous vehicle. In some implementations, each sensor can include a nozzle configured to provide a fluid to the sensor to delaminate debris from the sensor (e.g., from a surface of the sensor). In some implementations, the nozzles can be configured to provide a liquid fluid to the sensor. For example, in some implementations, the liquid fluid can be windshield washer fluid, methanol, propylene glycol, antifreeze, and/or ethanol.

The cleaning system can include one or more fluid source(s) that supply one or more fluid(s). As an example, in some implementations, the fluid source(s) can include a tank that stores a pressurized volume of a gas. For example, the tank can store pressurized air received from a compressor. As another example, for a liquid cleaning system, the fluid source(s) can include a liquid reservoir that stores a liquid (e.g., a windshield washer liquid reservoir). The fluid cleaning system can include a pump that pumps the liquid from the liquid reservoir to the nozzle(s). As yet another example, for a liquid cleaning system, the fluid source can include a tank that stores a pressurized volume of the liquid. For example, in some implementations, the volume of liquid can be pressurized using a pressurized gas (e.g., compressed air). In some implementations, the fluid can be a high pressure fluid, such as a fluid at a pressure of greater than 4.8 bar (approximately 70 psi).

The cleaning system can be configured to delaminate debris from the autonomous vehicle sensors. For example, in some implementations, each sensor of an autonomous vehicle can have one or more nozzles configured to clean the sensor. In some implementations, the cleaning system can include a plurality of nozzles, each nozzle configured to clean a sensor. The cleaning system can further include a flow control device (e.g. a solenoid) configured to allow or impede the flow of fluid from the fluid source to a nozzle. In some implementations in which a plurality of nozzles are included in the cleaning system, the cleaning system can include a plurality of flow control devices (e.g., solenoids), that respectively control a flow of the fluid from the fluid source to each respective nozzle. In some implementations, a plurality of flow control devices can be included in a manifold (e.g., a solenoid manifold) or other combined structure. In some implementations, one or more of the flow control device manifolds (e.g., solenoid manifolds) can be integrated with the corresponding fluid tank.

In some implementations, the cleaning system can include one or more controllers which can individually control each flow control device to allow the flow of the fluid to the corresponding nozzle to enable the corresponding nozzle to generate an oscillating fluid to delaminate debris from the corresponding sensor. For example, one or more controllers can be configured to actuate a solenoid to allow the high pressure fluid to be provided to a nozzle.

The cleaning system can further include one or more nozzles. Each nozzle can include an inlet configured to receive a high pressure fluid. For example, in some implementations, the inlet can include a first inlet wall and a second inlet wall opposite the first inlet wall. The first inlet wall can have a first portion and a second portion, and the second inlet wall can have a first portion and a second portion. The first portion of the first inlet wall and the first portion of the second inlet wall can define an opening configured to receive the high pressure fluid. For example, the opening can be configured to attach to a supply line, such as via a compression coupling, threaded coupling, soldered connection, brazed connection, mechanical fastener, or other suitable connection type. In some implementations, the second portion of the first inlet wall and the second portion of the second inlet wall can define a first throat having a first width. For example, in some implementations, the inlet can narrow from the opening to the first throat. In such a configuration, the narrowing of the inlet can aid in accelerating the flow of the fluid flowing through the inlet. The inlet can provide an unimpeded path of fluid flow. For example, the inlet can be free from posts or other obstructions configured to widen the oscillation angle of oscillating fluid generated by the nozzle.

The nozzle can further include an oscillator coupled with the inlet. For example, fluid can flow through the inlet into the oscillator. The oscillator can be configured to receive the fluid (e.g., a high-pressure fluid) from the inlet and generate an oscillating fluid. The oscillator can be associated with a longitudinal direction, a tangential direction that is perpendicular to the longitudinal direction, an upstream direction that is parallel to the longitudinal direction, and a downstream direction that is opposite to the upstream direction. For example, the longitudinal direction can generally follow the direction of the flow of the high pressure fluid through the nozzle, wherein the upstream direction is along the longitudinal direction relative to where the fluid is received, and the downstream direction is along the longitudinal direction relative to where the oscillating fluid is provided from the oscillator. The tangential direction can be, for example, generally perpendicular to the longitudinal direction.

In some implementations, the oscillator can include a first side wall and a second side wall opposite the first side wall. The oscillator can further include a first oscillation wall and a second oscillation wall. The first oscillation wall and the first side wall can define a first bypass tube. Similarly, the second oscillation wall and the second side wall can define a second bypass tube. The first oscillation wall and the second oscillation wall can define a mixing chamber with a second throat having a second width along the tangential direction at an upstream position of the mixing chamber, and a third throat with a third width along the tangential direction at a downstream position of the mixing chamber. In some implementations, the first oscillation wall and the second oscillation wall can both be generally concave in nature, such that the mixing chamber has a maximum width along the tangential direction between the second and third throat that is greater than the width of the second throat and the width of the third throat. For example, the mixing chamber can generally widen from the second throat to the maximum width, and generally narrow from the maximum width to the third throat. Stated differently, the width of the second throat can be less than the maximum width, and the width of the third throat can be less than the maximum width.

In some implementations, the first bypass tube of the oscillator can be configured to receive a first portion of the fluid received from the inlet, and the second bypass tube can be configured to receive a second portion of the fluid received from the inlet. The mixing chamber can be configured to receive third portion of the fluid received from the inlet. For example, the fluid can be a high pressure fluid, which can flow through the opening of the inlet, through the first throat, and into the oscillator, the first bypass tube, and the second bypass tube. The first portion of the fluid can flow through the first bypass tube, the second portion of the fluid can flow through the second bypass tube, and the third portion can flow through the second throat into the mixing chamber. The mixing chamber can be configured to combine at least a portion of the first portion, at least a portion of the second portion, and at least a portion of the third portion of the fluid to generate the oscillating fluid. For example, a portion of the first portion and a portion of the second portion of the fluid can flow from the first bypass tube and second bypass tube, respectively, through the third throat into the mixing chamber to combine with at least a portion of the third portion. The interaction of the first portion, the second portion, and the third portion of the fluid in the mixing chamber can generate the oscillating fluid by creating pressure and/or flow differentials within the mixing chamber. For example, alternating pressure differentials can be generated along the first oscillation wall and the second oscillation wall to cause the flow of the oscillating fluid to sweep from side to side.

The nozzle can further include an outlet coupled with the oscillator. The outlet can be configured to receive the oscillating fluid and provide the oscillating fluid to a surface to delaminate debris from the surface. For example, the surface can be a surface of a sensor (e.g. LIDAR sensor, radar sensor, camera, etc.).

In some implementations, the outlet can include a first exit wall proximate to the first bypass tube and a second exit wall proximate to the second bypass tube. The first and second exit walls can define a fourth throat having a fourth width, and an exit. In some implementations, the outlet can narrow from the fourth throat to the exit. For example, the first bypass tube can be configured such that the first bypass tube generally wraps around the first oscillation wall, and the second bypass tube can be configured such that the second bypass tube generally wraps around the second oscillation wall. Each bypass tube can include an opening defined by the first and second throats, and a terminal end defined by the fourth throat and the first and second oscillation walls, respectively. The first exit wall can be proximate to the first bypass tube, and the second exit wall can be proximate to the second bypass tube.

In some implementations, the outlet can widen at a downstream location from the exit. For example, in some implementations, the exit can include angled exit side walls which extend from the exit to the end of the nozzle. In some implementations, the angled exit side walls can be at an angle of approximately 60°. The angled exit side walls can be at other angles as well.

In some implementations, each oscillation wall can include a bumper at a downstream portion of the oscillation wall. In some implementations, each bumper can include a generally convex portion configured to assist in directing a flow from each respective bypass tube into the mixing chamber.

Each bumper can define a bumper length generally along the longitudinal direction. For example, the bumper length can be the length of the bumper from the third throat to the terminal end of the respective bypass tube. In some implementations, the ratio of the first throat to the bumper length of each oscillation wall can be approximately 1.0. As used herein, the term approximately when used in reference to a ratio means within plus or minus 20% of the stated value. For example, the bumper length can be a specific width, and the width of the first throat can be approximately the same width as the bumper length.

In some implementations, the ratio of the width of the opening to the width of the first throat can be approximately 2.8. For example, the opening of the inlet can be approximately 2.8 times wider than the width of the first throat. In some implementations, the ratio of the width of the opening width to the width of the first throat can be within a range of 2.24 to 3.36.

In some implementations, the ratio of the width of the second throat to the width of the first throat can be approximately 1.25. For example, the second throat in the oscillator can be approximately 1.25 times wider than the width of the first throat. Thus, the second throat can be wider than the first throat, which can allow the flow of fluid to expand as it enters the second throat from the first throat. In some implementations, the ratio of the width of the second throat to the width of the first throat can be within a range of 1.0 to 1.5.

In some implementations, the ratio of the width of the third throat to the width of the first throat can be approximately 2.4. For example, the third throat can be approximately 2.4 times wider than the width of the first throat. In some implementations, the ratio of the width of the third throat to the width of the first throat can be within a range of 1.92 to 2.88.

In some implementations, the ratio of the width of the maximum width of the mixing chamber to the first throat can be approximately 3.5. For example, the maximum width of the mixing chamber can be approximately 3.5 times wider than the width of the first throat. In some implementations, the ratio of the width of the maximum width to the width of the first throat can be within a range of 2.8 to 4.2.

In some implementations, the ratio of the width of the fourth throat to the width of the first throat can be approximately 2.0. For example, the fourth throat in the oscillator can be approximately 2.0 times wider than the width of the first throat. In some implementations, the ratio of the width of the fourth throat to the width of the first throat can be within a range of 1.6 to 2.2.

In some implementations, the exit of the outlet can be narrower than the first throat. For example, the ratio of the width of the exit to the width of the first throat can be approximately 0.8. In some implementations, the ratio of the width of the exit to the width of the first throat can be within a range of 0.64 to 0.96.

Each bypass tube can define a bypass width. The bypass width can be, for example, the width of the bypass tube between the respective side wall and the respective oscillation wall. In some implementations, the ratio of the bypass width to the width of the first throat can be approximately 0.6. For example, the bypass width of each bypass tube can be narrower than the first throat. In some implementations, the ratio of the bypass width of each bypass tube to the width of the first throat can be within a range of 0.48 to 0.72.

In some implementations, the high-pressure fluid received at the inlet can be a fluid at a pressure of greater than 4.8 bar (approximately 69 psi). In some implementations, the high-pressure fluid can be at a pressure within a range of 4.8 bar to 6.2 bar. In some implementations, the high pressure fluid can be at any suitable pressure.

In some implementations, the oscillating fluid can oscillate at approximately 100 Hz. As used herein, the term "approximately" when used in reference to an oscillation frequency means within plus or minus 20% of the stated value. For example, the oscillator of a nozzle can be configured to receive a fluid, such as a high-pressure fluid, and generate an oscillating fluid which sweeps from side to side. In some implementations, the oscillator can be configured to generate an oscillating fluid that oscillates at approximately 100 Hz. In some implementations, the oscillator can be configured to generate an oscillating fluid that oscillates at a frequency within a range of 80 Hz to 120 Hz.

In some implementations, the oscillating fluid can oscillate across and oscillation angle of approximately 30°. As used herein, the term "oscillation angle" refers to an angle across which the oscillating fluid oscillates. As used herein, the term "approximately" when used in reference to an angle means within plus or minus 5° of the stated value. For example, the longitudinal direction of the nozzle can correspond to a centerline of fluid flow. The oscillating fluid can oscillate from approximately 15° on one side of the centerline to 15° on the opposite side of the centerline, thus having an oscillation angle of approximately 30°. In some implementations, the oscillating fluid can oscillate across an oscillation angle within a range of 25° to 35°. The flow of the oscillating fluid can sweep from one side of the centerline to the other side of the centerline, thus oscillating between the two sides.

In some implementations, the nozzle can be positioned at an angle of inclination in a range of approximately 14° to 16° to the surface. For example, the surface can be a surface of a sensor, and the nozzle can be positioned such that the nozzle is at approximately a 14° to 16° angle to the surface. In some implementations, the nozzle can be positioned at an angle of inclination within a range of 9° to 21° to the surface. By positioning the nozzle at an angle of inclination, the oscillating fluid from the nozzle can be directed onto the surface in a manner that generates a wave of oscillating fluid that sweeps from side to side across the oscillation angle. This wave of oscillating fluid can aid in delaminating debris from the surface.

According to additional aspects the present disclosure, in some implementations, the cleaning system can include an adjustable nozzle. For example, in some implementations, the mixing chamber of the nozzle can be adjustable by adjusting a least a portion of the first oscillation wall or a portion of the second oscillation wall.

For example, an adjustable nozzle can include an inlet configured to receive a pressurized fluid. In some implementations, the pressurized fluid can be a high-pressure fluid, such as a fluid at a pressure of greater than 4.8 bar. The inlet can be configured to receive the pressurized fluid by, for example, coupling the inlet to a supply line connected to a fluid source. The fluid source can be, for example, a pressurized tank or other fluid source as described herein.

The adjustable nozzle can further include an adjustable oscillator coupled with the inlet. The adjustable oscillator can be configured to receive the pressurized fluid from the inlet and generate an oscillating fluid. The oscillator can include a first oscillation wall comprising a first adjustable chamber modifier wall and a second oscillation wall comprising a second adjustable chamber modifier wall. The first adjustable chamber modifier wall and the second adjustable chamber modifier wall can define an adjustable mixing chamber configured to generate the oscillating fluid having one or more properties that are adjustable by the first adjustable chamber modifier wall or the second adjustable chamber modifier wall. For example, in some implementations, the first adjustable chamber modifier wall and the second adjustable, modifier wall can be used to adjust an oscillation frequency, an oscillation angle, and/or a direction of a flow of the oscillating fluid. The adjustable nozzle can further include an outlet coupled with the adjustable oscillator, which can be configured to receive the oscillating fluid and eject the oscillating fluid from the adjustable nozzle.

The adjustable oscillator can further include a first side wall and a second side wall. The first side wall can be generally opposite the second side wall. The first oscillation wall can include a first bypass wall. The first bypass wall and the first side wall can define a first bypass tube. Similarly, the second oscillation wall can include a second bypass wall. The second bypass wall and the second side wall can define a second bypass tube.

In some implementations, the first bypass tube of the adjustable oscillator can be configured to receive a first portion of the fluid received from the inlet, and the second bypass tube can be configured to receive a second portion of the fluid received from the inlet. The adjustable mixing chamber can be configured to receive third portion of the fluid received from the inlet. For example, the fluid can be pressurized fluid, which can flow through the opening of the inlet and into the oscillator. The first portion of the fluid can flow through the first bypass tube, the second portion of the fluid can flow through the second bypass tube, and the third portion can flow through the second throat into the adjustable mixing chamber. The adjustable mixing chamber can be configured to combine at least a portion of the first portion, at least a portion of the second portion, and at least a portion of the third portion of the fluid to generate the oscillating fluid. For example, a portion of the first portion and a portion of the second portion of the fluid can flow from the first bypass tube and second bypass tube, respectively, back into the adjustable mixing chamber to combine with at least a portion of the third portion. The interaction of the first portion, the second portion, and the third portion of the fluid in the adjustable mixing chamber can generate the oscillating fluid by creating pressure and/or flow differentials within the adjustable mixing chamber. For example, alternating pressure differentials can be generated along the first adjustable chamber modifier wall and the second adjustable chamber modifier wall to cause the flow of the oscillating fluid to sweep from side to side.

The adjustable oscillator can define a longitudinal direction, a tangential direction, an upstream direction, and a downstream direction. For example, the longitudinal direction can generally follow the direction of the flow of the pressurized fluid through the nozzle, wherein the upstream direction is along the longitudinal direction proximate to where the pressurized fluid is received, and the downstream direction is along the longitudinal direction proximate to where the oscillating fluid is provided from the nozzle. The tangential direction can be, for example, generally perpendicular to the longitudinal direction.

In some implementations, the first oscillation wall can include a first upstream flexure at an upstream portion of the first oscillation wall and a first downstream flexure at a downstream portion of the first oscillation wall. The first adjustable chamber modifier wall can be connected to the first bypass wall via the first upstream flexure and the first downstream flexure. For example, the first bypass wall of the first oscillation wall can be connected to a floor of the adjustable oscillator. For example, the adjustable nozzle can be cast or machined out of a single piece of material, and the first bypass wall can be affixed to the floor of the adjustable oscillator. The first adjustable chamber modifier wall can be connected to the first bypass wall by the first upstream flexure in the first downstream flexure. The first upstream flexure and the first downstream flexure can be independently movable by, for example, being flexible in order to allow the first adjustable chamber modifier wall to move generally along the tangential direction to increase or decrease the adjustable mixing chamber. For example, while the first bypass wall can be affixed to the floor of the adjustable oscillator, the first adjustable chamber modifier wall and the first upstream and first downstream flexures can be disconnected from the floor. In this way, the first upstream and first downstream flexures can extend and retract generally along the tangential direction to expand or contract the adjustable mixing chamber.

Similarly, the second oscillation wall can include a second upstream flexure at an upstream portion of the second oscillation wall and a second downstream flexure at a downstream portion of the second oscillation wall. The second adjustable chamber modifier wall can be connected to the second bypass wall via the second upstream flexure and the second downstream flexure. The second upstream flexure and the second downstream flexure can be independently movable by, for example, being flexible in order to allow the first adjustable chamber modifier wall to move generally along the tangential direction to increase or decrease the adjustable mixing chamber, as with the first adjustable chamber modifier wall.

In some implementations, the independent movement of the first upstream flexure, the first downstream flexure, the second upstream flexure, and the second downstream flexure can be controlled by a controller to adjust the adjustable mixing chamber. For example, in some implementations, the adjustable nozzle can include one or more electromagnets configured to generate one or more electromagnetic fields. The controller can be configured to control the one or more electromagnets to adjust the shape of the adjustable mixing chamber. For example, the adjustable nozzle can further include one or more magnetically controllable fluids, such as FerroFluid, which can react to the one or more electromagnetic fields to adjust the shape of the adjustable mixing chamber.

For example, in some implementations, the first bypass wall and the first chamber modifier wall can define a first upstream cavity at an upstream portion of the first oscillation wall and a first downstream cavity at a downstream portion of the first oscillation wall. Similarly, the second bypass wall and the second chamber modifier wall can define a second upstream cavity at an upstream portion of the second oscillation wall and a second downstream cavity at a downstream portion of the second oscillation wall.

In some implementations, the first oscillation wall can include a first upstream magnetically controllable fluid positioned in the first upstream cavity and a first downstream magnetically controllable fluid positioned in the first downstream cavity. For example, the magnetically controllable fluid can be FerroFluid. The magnetically controllable fluid can be controlled by a magnetic field. For example, a magnetic field can cause the magnetically controllable fluid to align along the magnetic field flux lines. Similarly, the second oscillation wall can include a second upstream magnetically controllable fluid positioned in the second upstream cavity and a second downstream magnetically controllable fluid positioned in the second downstream cavity. As the magnetically controllable fluids align with the respective electromagnetic fields, the magnetically controllable fluids can exert a pressure on the respective flexures and/or adjustable chamber modifier walls to expand or contract the adjustable mixing chamber.

For example, in some implementations, the adjustable nozzle can include a first upstream electromagnet configured to generate a first upstream electromagnetic field across the first upstream magnetically controllable fluid, a first downstream electromagnet configured to generate a first downstream electromagnetic field across the first downstream magnetically controllable fluid, a second upstream electromagnet configured to generate a second upstream electromagnetic field across the second upstream magnetically controllable fluid, and a second downstream electromagnet configured to generate a second downstream electromagnetic field across the second downstream magnetically controllable fluid. For example, each of the electromagnets can be positioned outside of the bypass tubes generally along the tangential direction from the respective magnetically controllable fluids.

In some implementations, each of the electromagnets can be controlled to generate a respective magnetic field. For example, a current can be run through each electromagnet to generate a respective magnetic field. The magnetically controllable fluid (e.g., FerroFluid) can react to the respective magnetic field by forming along the flux lines of the field. This, in turn, can cause the respective magnetically controllable fluid to expand the flexures in the respective location. For example, the first upstream magnetically controllable fluid can extend or contract generally along the tangential direction, thereby creating a force on the first upstream flexure, causing the upstream portion of the first chamber modifier wall to extend or retract generally along the tangential direction, thereby narrowing or expanding the adjustable mixing chamber. Similarly, each respective magnetically controllable fluid can react to a respective magnetic field generated by the respective electromagnet.

In some implementations, the first adjustable chamber modifier wall and the second adjustable chamber modifier wall can define an upstream throat along the tangential direction at an upstream portion of the adjustable mixing chamber and a downstream throat along the tangential direction at a downstream portion of the adjustable mixing chamber. The first upstream electromagnet and the second upstream electromagnet can be configured to adjust a width and orientation of the upstream throat by generating the first upstream electromagnetic field and the second upstream electromagnetic field, respectively. Similarly, the first downstream electromagnetic and the second downstream electromagnet can be configured to adjust a width and orientation of the downstream throat by generating the first downstream electromagnetic field and the second downstream electromagnetic field, respectively. In this way, the adjustable mixing chamber can be finely controlled by controlling the electromagnetic fields generated by each of the electromagnets in the adjustable nozzle.

In some implementations, the first upstream electromagnet, the first downstream electromagnet, the second upstream electromagnet, and the second downstream electromagnet can be configured to be controlled by a controller to induce the first upstream electromagnetic field, the second downstream electromagnetic field, the second upstream looked magnetic field, and the second downstream electromagnetic field, respectively. For example, the controller can be configured to control a current provided to each of the electromagnets independently. In this way, the controller can be configured to control the movement of the adjustable chamber walls by controlling the current provided to the electromagnets.

In some implementations, the pressurized fluid can be a fluid at a pressure greater than 4.8 bar. In some implementations, the pressurized fluid can be a liquid fluid, such as windshield washer fluid, methanol, propylene glycol, antifreeze, and/or ethanol.

In some implementations, the adjustable nozzle can be configured to eject the oscillating fluid onto a surface of a sensor of an autonomous vehicle to delaminate debris from the surface. For example, the adjustable nozzle can be positioned at an angle to a surface of a sensor such as, at an inclination angle of approximately 12-14°.

In some implementations, the nozzles (e.g., static or adjustable nozzle) according to example aspects the present disclosure can include a baseplate and a top. The baseplate can be, for example, a single piece of material which can include the inlet, the oscillator (e.g., static or adjustable oscillator), and the outlet. The top can be, for example, a single piece of material configured to attach to the baseplate in order to enclose the inlet, the oscillator, and the outlet.

In some implementations, the base plate and top can be manufactured from metal, plastic, or any other suitable material. For example, in some implementations, the baseplate can be milled from a solid piece of material (e.g., aluminum, steel, plastic). For example, the inlet, bypass flow tubes, mixing chamber, and outlet can be cut into a solid piece of material, thereby creating a floor and the various fluid flow pathways of the nozzle. In some implementations, the baseplate can be manufactured by additive manufacturing, injection molding, or any other suitable process. In some implementations, the top can be manufactured out of a corresponding piece of material, such as metal or plastic, and can be attached to the baseplate in order to enclose the various chambers. For example, in some implementations, the top be attached to the baseplate via laser welding, ultrasonic welding, brazing, conventional welding, coupling via one or more fasteners (e.g., screws), or any other suitable method. In some implementations, the top can be essentially parallel to the floor of the baseplate.

The nozzles and cleaning systems according to example aspects of the present disclosure can provide any number of technical effects and benefits. For example, one advantage provided by the nozzles according to example aspects of the present disclosure as compared to conventional nozzles is that the nozzles provided herein can allow for a relatively straight flow path of fluid through the nozzles. For example, in some conventional nozzles, one or more posts may be included in an inlet region of the nozzle, which can cause a wider oscillation angle of the oscillating fluid ejected from the nozzle. Such posts, however, can impede the flow of fluid through the nozzle, and further can reduce the suitable pressure levels capable of generating an oscillating fluid. For example, in some conventional nozzles, the nozzles may only be able to accept fluid at a pressure of 0.7 bar to 1.4 bar (approximately 10-20 psi) for proper operation.

The relatively straight flow paths of the nozzles according to example aspects of the present disclosure, however, allow for higher pressure fluids to be provided to the nozzle, such as, for example, fluids at a pressure greater than 4.8 bar (approximately 70 psi). Further, higher pressure fluids can flow at higher velocities. This, in turn, can allow for the oscillating fluids generated by the nozzles disclosed herein to achieve significantly higher momentums per droplet than oscillating fluids generated by conventional nozzles. For example, oscillating fluids generated by the nozzles disclosed herein can achieve momentums per droplet an order of magnitude higher than oscillating fluids generated by conventional nozzles.

Further, the nozzles and systems according to example aspects of the present disclosure can allow for oscillating fluid oscillate at approximately 100 Hz, as compared to conventional nozzles which typically oscillate in the range of 400 to 500 Hz. The slower oscillation frequency of oscillating fluid generated by nozzles according to example aspects of the present disclosure can allow for the oscillating fluid to build up on a surface as the fluid contacts the surface, which can aid in generating a wave of fluid to delaminate debris from the surface. For example, rather than generating an oscillating spray which merely wets a surface, the nozzles according to example aspects of the present disclosure can generate an oscillating fluid jet which sweeps from side to side across the oscillation angle to delaminate debris from the surface.

Additionally, the nozzles and systems according to example aspects of the present disclosure can allow for a narrower oscillation angle than is typically generated by conventional nozzles. For example, conventional nozzles may have an oscillation angle of 60° or higher, as compared to the approximately 30° oscillation angle or variable oscillation angles generated by nozzles according to example aspects the present disclosure. These narrower oscillation angles can further aid in delaminating debris from a surface by, for example, focusing the oscillating fluid spray to a more confined area. Thus, the oscillating fluid generated by nozzles according to example aspects the present disclosure can direct more oscillating fluid to a particular area of a surface than conventional nozzles.

Additionally, the nozzles and systems according to example aspects of the present disclosure can allow for a reduced amount of fluid to be used to clean the surface of the sensor. For example, the increased momentum of the oscillating fluid as compared to conventional nozzles can allow for a rapid delamination of debris from the surface (e.g., in less than 500 ms). This can allow for very short duration sprays to be used in order to delaminate the debris. In some implementations, the nozzles and systems according to example aspects of the present disclosure can use approximately 75-80% less fluid than a conventional nozzle.

Moreover, the nozzles and systems according to example aspects of the present disclosure can allow for the efficient removal of debris from a sensor during operation of an autonomous vehicle, thereby enabling improved operation of the sensor. Improved performance of the sensor can lead to improved performance of the autonomous vehicle motion control, which relies upon data collected by the one or more sensors to comprehend the surrounding environment of the autonomous vehicle. Thus, the improved nozzles and cleaning systems of the present disclosure can directly improve autonomous vehicle performance such as efficiency, safety, and passenger comfort.

Further, in implementations in which an adjustable nozzle is used, the oscillation frequency, oscillation angle, and the direction of flow of the oscillating fluid can be adjusted to delaminate debris from a sensor. For example, in some operating conditions, a piece of debris may be particularly resistant to delamination from the surface, such as bug debris deposited on the surface at a high rate of speed. By adjusting the oscillation angle, oscillation frequency, or direction of flow of the oscillating fluid, a targeted and/or increased flow of fluid can be provided to the region of the surface in which the debris is located in order to delaminate the debris from the surface.

With reference now to the FIGS., example aspects of the present disclosure will be discussed in further detail. FIG. 1 depicts a block diagram of an example autonomous vehicle 10 according to example aspects of the present disclosure. The autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 can include one or more computing devices 111. The one or more computing devices 111 can include one or more processors 112 and one or more memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The one or more memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations. The one or more computing devices 111 can also include a communication interface 119, which can allow the one or more computing devices 111 to communicate with other components of the autonomous vehicle 10 or external computing systems, such as via one or more wired or wireless networks.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. In some implementations, the perception system 103, the prediction system 104, the motion planning system 105 can be included in or otherwise a part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine a position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can create prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the predictions system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the autonomous vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the autonomous vehicle 10, the motion planning system 105 can determine a motion plan for the autonomous vehicle 10 that best navigates the autonomous vehicle 10 relative to the objects at such locations and their predicted trajectories.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion plan can be, for example, a path along which the autonomous vehicle 10 will travel in one or more forthcoming time periods. The motion planning system 105 can provide the selected motion plan to a vehicle controller 106 that controls one or more vehicle controls 107 (e.g., actuators or other devices that control gas flow, steering, braking, etc.) to execute the selected motion plan. In some implementations, the motion planning system 105 can be configured to iteratively update the motion plan for the autonomous vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

The autonomous vehicle 10 can further include a sensor cleaning system 200 configured to clean one or more sensors 101 of the autonomous vehicle 10.

Figure 2:
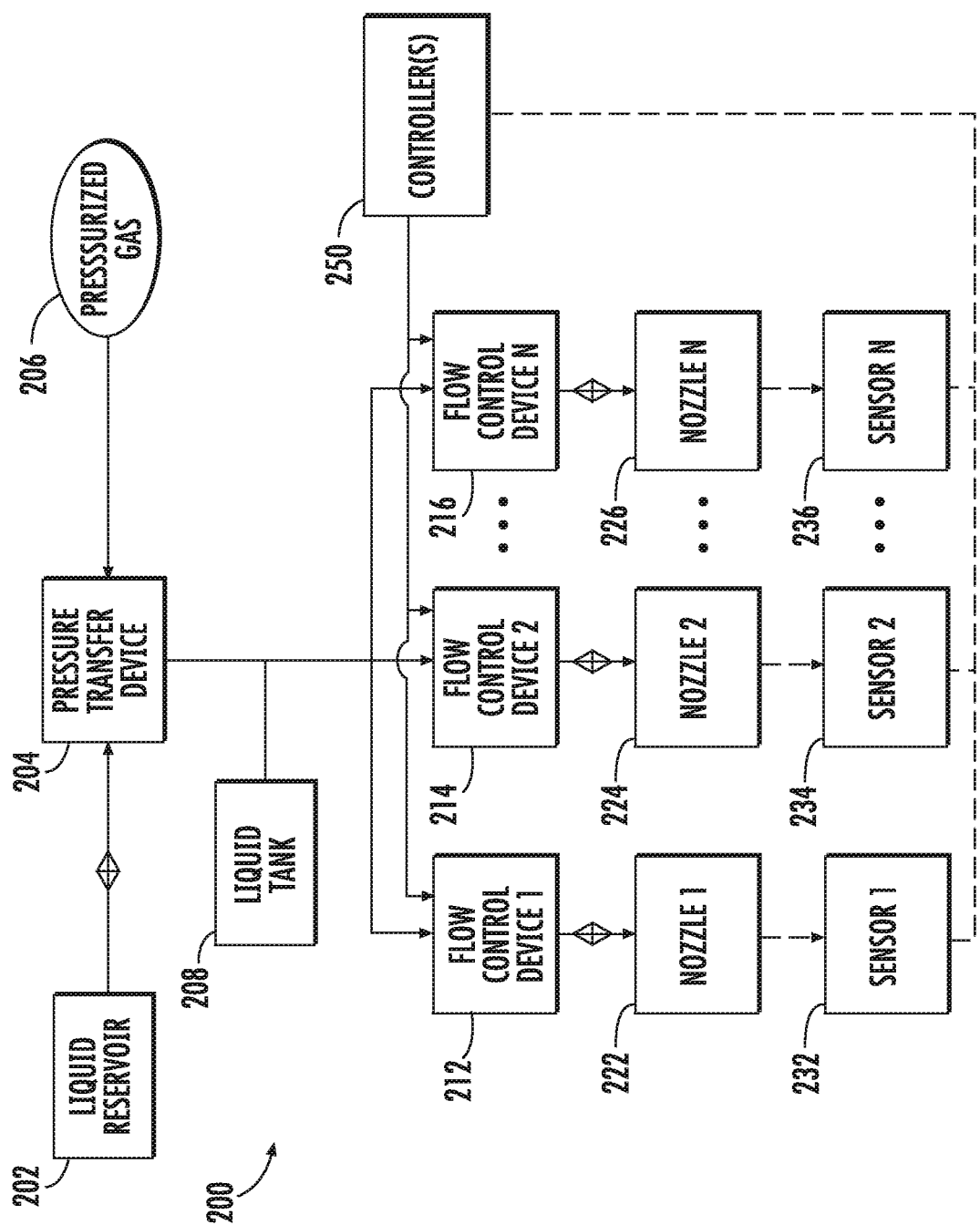
FIG. 2 depicts a block diagram of an example cleaning system according to example aspects of the present disclosure.

FIG. 2 depicts a block diagram of an example fluid-based (e.g., liquid, air) sensor cleaning system 200 according to example embodiments of the present disclosure. The fluid-based sensor cleaning system 200 can be included in an autonomous vehicle 10 to clean the sensors 101 of the autonomous vehicle 10.

In particular, as shown, the system 200 is a pressurized-gas, liquid cleaning system 200. In various other implementations, the system 200 can be a hydraulic pressurized fluid cleaning system, such as liquid pressurized via one or more pumps. Further, in some implementations, the system 200 can be a pressurized gas cleaning system, wherein the cleaning fluid can be pressurized gas (e.g., compressed air), such as from a source of pressurized gas 206.

The fluid-based sensor cleaning system 200 of FIG. 2 includes a pressure transfer device 204. The pressure transfer device 204 can receive liquid from a liquid reservoir 202. For example, the liquid reservoir 202 can be a windshield washer reservoir of the autonomous vehicle. In some implementations, the liquid fluid can be windshield washer fluid, methanol, propylene glycol, antifreeze, and/or ethanol.

In some implementations, the pressure transfer device 204 can pull liquid from the liquid reservoir 202. For example, the pressure transfer device 204 can include an internal mechanism that operates to draw liquid from the liquid reservoir 202 to the pressure transfer device 204. In one example, such internal mechanism includes a biasing element (e.g., a mechanical spring) that biases a partition included in the pressure transfer device 204 toward increasing a volume of a liquid chamber in the device 204, thereby pulling liquid from the reservoir 202 to the device 204. In other implementations, the system 200 can include a pump (not illustrated) that actively pumps or pushes the liquid from the liquid reservoir 202 to the pressure transfer device 204. The pump can be controlled (e.g., by the one or more controllers 250) based on knowledge of an amount of liquid included in the pressure transfer device 204 and/or the liquid tank 208. For example, various sensors or other components can be used to monitor the amount of liquid included in the pressure transfer device 204 and/or the liquid tank 208. When additional liquid is desired, the pump is operated to pump liquid from the reservoir 202 to the pressure transfer device 204.

Referring still to FIG. 2, the pressure transfer device 204 can use pressurized gas 206 to pressurize the liquid received from the liquid reservoir 202. Liquid pressurized by the pressure transfer device can be stored in a liquid tank 208. For example, the liquid tank 208 can be a liquid accumulator. In some implementations, the liquid tank 208 and the pressure transfer device 204 can be integrated together into a single component. The liquid reservoir 202, pressure transfer device 204, pressurized gas 206, the liquid tank 208, a liquid pump (not shown), or any other suitable fluid source can be included in or otherwise form a part of a fluid source, source of pressurized fluid, or source of high pressure fluid, as those terms are used herein. The components 202-208 shown in FIG. 2 are illustrative of one example fluid source, but one of ordinary skill in the art will recognize that any number of fluid sources can be used to provide a pressurized fluid in a cleaning system, as described herein.

In some implementations, the liquid reservoir 202, pressure transfer device 204, pressurized gas 206, the liquid tank 208, and/or any other fluid source can be a high pressure fluid source. For example, in some implementations, the fluid stored in the liquid tank 208 and/or the pressurized gas 206 can be at a pressure greater than 4.8 bar (approximately 70 psi). Referring still to FIG. 2, the pressurized fluid provided by the pressure transfer device 204 and/or stored in the tank 208 can be respectively provided to a plurality of flow control devices 212, 214, and 216.

The fluid-based sensor cleaning system 200 can also include a plurality of nozzles, as shown at 222, 224, and 226. Although three nozzles 222-226 are shown, any number of nozzles can be included in the system 200. Each nozzle 222-226 can use the pressurized fluid (e.g., pressurized liquid, compressed air) to clean a respective sensor, as shown at 232, 234, and 236. The sensors 232-236 can correspond to, for example, individual sensors 101 depicted in FIG. 1. For example, each nozzle 222-226 can spray or otherwise release the pressurized fluid onto the sensor (e.g., a lens, cover, housing, or other portion of the sensor) to remove contaminants or other debris from the sensor (e.g., from the lens, cover, housing, or other portion of the sensor). In some implementations, one or more of the nozzles 222-226 can include a nozzle that sprays the pressurized fluid onto the sensor 232-236 to clean the sensor 232-236. In some implementations, each nozzle 222-226 can be integral to the corresponding sensor 232-236.

The fluid-based sensor cleaning system 200 can also include the plurality of flow control devices, as shown at 212, 214, and 216. The flow control devices 212-216 can respectively control a flow of the pressurized fluid from the pressure transfer device 204 and/or the liquid tank 208 to the plurality of nozzles 222-226.

The sensor cleaning system 200 can further include one or more controllers 250 (also referred to as a computing device). The one or more controllers 250 can individually control each flow control device 212-216 to allow the flow of the pressurized fluid to the corresponding nozzle 222-226 to enable the corresponding nozzle 222-226 to individually clean the corresponding sensor 232-236, such as according to a spray pattern.

The one or more controllers 250 can include one or more control devices, nozzles, or components that interface with or otherwise control the one or more flow control devices 212-216. As examples, a controller 250 can include one or more chips (e.g., ASIC or FPGA), expansion cards, and/or electronic circuitry (e.g., amplifiers, transistors, capacitors, etc.) that are organized or otherwise configured to control one or more flow control devices (e.g., by way of control signals). In some implementations, a controller 250 can include a processor that loads and executes instructions stored in a computer-readable media to perform operations.

In some implementations, the one or more controllers 250 include a single controller. In some implementations, the one or more controllers 250 include a plurality of controllers that respectively control the plurality of flow control devices 212-216. In some implementations, the one or more controllers 250 can be physically located on a control board. For example, the control board can be physically coupled to a flow control device manifold, as described below.

In some implementations, the plurality of flow control devices 212-216 can include a plurality of solenoids that are individually controllable by the one or more controllers 250 to respectively allow or impede the flow of the pressurized fluid to the corresponding nozzle 222-226. That is, the one or more controllers 250 can individually control each solenoid to control the respective flow of liquid to the corresponding nozzle 222-226, thereby enabling cleaning of each sensor 232-236 according to a respective spray pattern for the sensor 232-236.

In some implementations, one or more of the flow control device manifolds (e.g., solenoid manifolds) can be integrated with the liquid tank 208. As an example, a solenoid manifold that controls the respective flow of the pressurized fluid to the nozzles 222-226 can be physically located within a pressurized volume of the fluid stored by a liquid tank 208. In some implementations, the one or more controllers 250 can also be integrated with the liquid tank 208.

Inclusion of the flow control device manifold within the liquid tank 208 enables such components to be provided as a single package, thereby saving space. Inclusion of the flow control device manifold within the liquid tank 208 also decreases the respective fluid flow distances from the tank 208 to the nozzles 222-226, thereby eliminating pressure loss due to hose length and, conversely, increasing pressure of the fluid when used by the nozzles 222-226.

In addition, in some implementations, the integrated liquid tank can further include valves, a pressure sensor, and/or controls coupled thereto or otherwise integrated therewith.

In some implementations, an entirety of the sensor cleaning system 200 exclusive of wiring is physically located external to a cab of the autonomous vehicle. As one example, all system components except for the liquid reservoir 202 can be located on the roof of the vehicle (e.g., in the pod mounted on the roof of the vehicle). For example, the liquid reservoir 202 can be located under a hood of the vehicle. In addition, in some implementations, the entirety of the sensor cleaning system 200 inclusive of wiring is physically located external to the cab of the autonomous vehicle.

In some implementations, the sensor cleaning system 200 can further include a controller area network. For example, the one or more controllers 250 can transmit control signals on the controller area network to control the plurality of flow control devices 212-216. Use of a controller area network by the sensor cleaning system 200 contrasts with the more typical use of a local interconnect network in vehicular applications. Use of a controller area network enables use a message broadcast and renders the sensor cleaning system 200 infinitely scalable from a communications perspective.

As one example, in some implementations, at least two or more of the flow control devices 212-216 can be integrated into the liquid tank 208, as described above. The integrated tank can include a number of connection pins that receive control signals from the controller area network. In some implementations, the control signals that control the flow control devices 212-216 can include a sequence signal and a firing order signal that instruct the integrated tank how to control the corresponding flow control devices 212-216. In one example, the integrated tank can have four connection pins that respectively correspond to power, ground, sequence, and firing order.

An advantage provided by the example cleaning systems 200 of the present disclosure is the ability to use a high pressure fluid to clean one or more sensors 232-236 of an autonomous vehicle 10. Using a high pressure fluid can allow for increased delamination of debris from a sensor 232-236.

Figure 3:
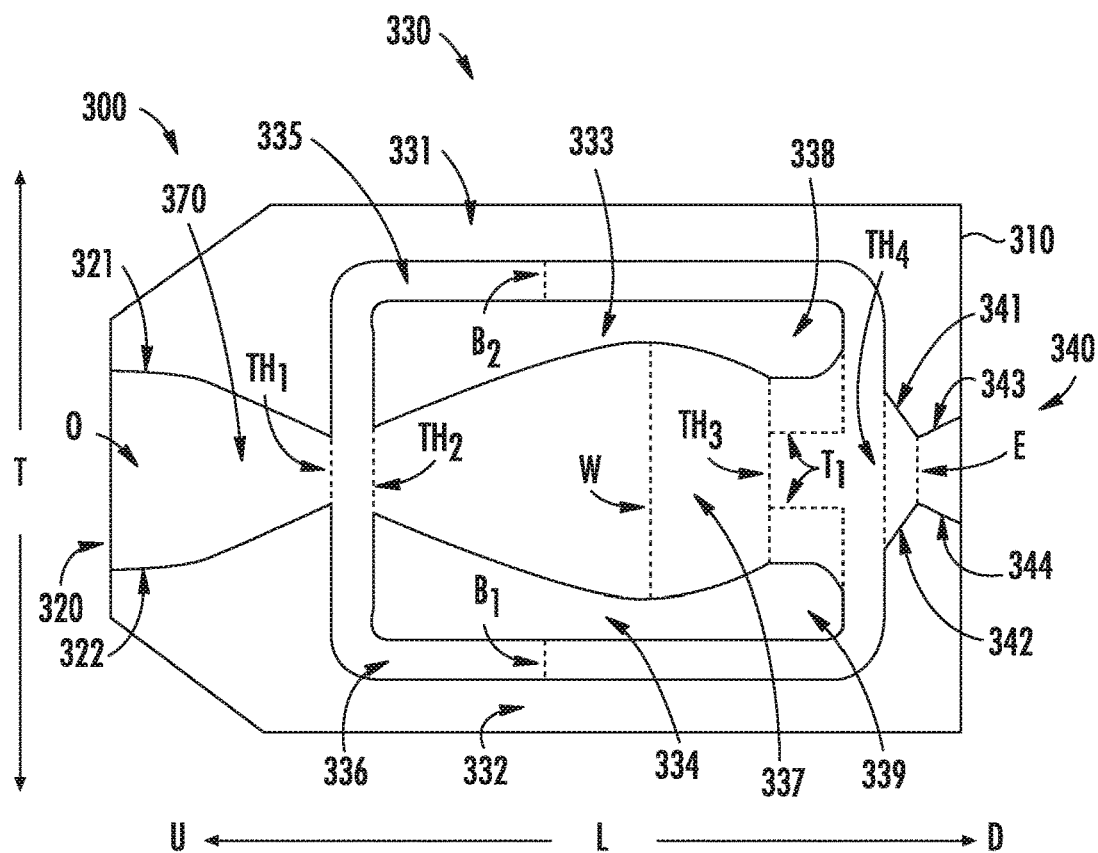
FIG. 3 depicts a top-view of an example nozzle according to example aspects of the present disclosure.

Referring now to FIG. 3, a top down view of an example nozzle 300 according to example aspects of the present disclosure is depicted. The nozzle 300 can be used in a cleaning system 200, and can correspond to the nozzles 222-226 depicted in FIG. 2. As shown, the nozzle 300 can include a baseplate 310. The baseplate 310 can include an inlet 320, oscillator 330, and an outlet 340. The inlet 320 can be configured to receive a high pressure fluid, such as a high-pressure liquid from a liquid tank 208 or pressurized air from source of a pressurized gas 206. The inlet 320 can coupled with the oscillator 330 such that the inlet 320 is in fluid communication with the oscillator 330. For example, fluid flowing into the inlet 320 can flow into the oscillator 330. Similarly, the oscillator 330 can be coupled with the outlet 340 such that the oscillator 330 is in fluid communication with the outlet 340. For example, fluid flowing into the oscillator 330 can exit the nozzle 300 via the outlet 340.

The oscillator 330 can be associated with a longitudinal direction L and a tangential direction T. The tangential direction T can be generally perpendicular to the longitudinal direction L. An upstream direction U can run parallel to the longitudinal direction L. Fluid can enter the inlet 320 at the upstream direction U, flow generally through the nozzle 300 along the longitudinal direction L, and exit the nozzle 300 via the outlet 340 at the downstream direction D. Thus, fluid can generally flow from the upstream direction U to the downstream direction D.

In some implementations, the inlet 320 can include a first inlet wall 321 and a second inlet wall 322. The first inlet wall 321 can include a first portion and a second portion. For example, the first portion can be at an upstream direction of the first inlet wall 321, and the second portion can be at a downstream direction of the first inlet wall 321. Similarly, the second inlet wall 322 can include a first portion and a second portion. The first portion can be at an upstream direction of the second inlet wall 322 and the second portion can be at a downstream direction of the second inlet wall 322. The second inlet wall 322 can be opposite the first inlet wall 321, such as on an opposite side of the nozzle 300 along the tangential direction T from the first inlet wall 321.

The first portion of the first inlet wall 321 and the first portion of the second inlet wall 322 can together define an opening O configured to receive a pressurized fluid, such as a high pressure fluid. For example, in various implementations, the opening of the inlet 320 can include various couplers, connectors, or other adapters to allow the opening to receive the pressurized fluid, such as via a threaded, pressure fit, or other connection.

The second portion of the first inlet wall 321 and the second portion of the second inlet wall 322 can together define a first throat $TH_1$ having a first width. As shown, the first inlet wall 321 and the second inlet wall 322 can narrow from the opening O to the first throat $TH_1$.

The inlet 320 can provide an unimpeded path of fluid flow to the oscillator. For example, as shown, the inlet 320 does not include any obstructions in the path of fluid flow from the inlet to the oscillator, such as posts, diverters, or other obstructions. Rather, the inlet 320 includes two sidewalls which narrow to a throat, but do not impede the path of fluid flow, such as in an inlet including posts or diverters.

In some implementations, the fluid received at the inlet 320 can be a high pressure fluid at a pressure of greater than 4.8 bar. For example, the inlet 320 can be coupled to a supply line which can be coupled to a source of high pressure fluid (e.g., liquid tank 208) in some implementations, a flow control device can be coupled between the inlet 320 and the source of high pressure fluid to allow or impede the flow of the high pressure fluid to the nozzle 300. The fluid (e.g., liquid, compressed air) received at the inlet 320 at a pressure of greater than 4.8 bar. In some implementations, the high-pressure fluid can be at a pressure within a range of 4.8 bar to 6.2 bar. In some implementations, the high pressure fluid can be at any suitable pressure.

The oscillator 330 can be configured to receive the pressurized fluid from the inlet and generate an oscillating fluid. For example, in some implementations, the oscillator 330 can include a first side wall 331, a second side wall 332, a first oscillation wall 333, and a second oscillation wall 334. The first oscillation wall 333 and the first side wall 331 can together define a first bypass tube 335, and the second oscillation wall 334 and the second side wall 332 can together define a second bypass tube 336. In some implementations, the first bypass tube 335 can have a first bypass width $B_2$, and the second bypass tube 336 can have a second bypass width $B_1$. The first bypass width $B_2$ and/or the second bypass width $B_1$ can be, for example, the width between the first side wall 331 and the first oscillation wall 333 or the second sidewall 332 and the second oscillation wall 334, respectively.

In some implementations, the first oscillation wall 333 and the second oscillation wall 334 can together define a mixing chamber 337. Further, the first oscillation wall 333 and the second oscillation wall 334 can together define a second throat $TH_2$ having a second width and a third throat $TH_3$ having a third width. The second throat $TH_2$ can be at an upstream portion of the mixing chamber 337 and the third throat $TH_3$ can be at a downstream portion of the mixing chamber 337. The mixing chamber can further define a maximum width W along the tangential direction between the second throat and the third throat. In some implementations, the width of the second throat $TH_2$ and the width of the third throat $TH_3$ can be less than the maximum width W. For example, the mixing chamber 337 can widen from the second throat $TH_2$ to the maximum width W, and narrow from the maximum width W to the third throat $TH_3$.

In some implementations, the first oscillation wall 333 can include a first bumper 338 at a downstream portion of the first oscillation wall 333. Similarly, the second oscillation wall 334 can include a second bumper 339 at a downstream portion of the second oscillation wall 334. Each bumper 338/339 can define a bumper length $T_1$ along the longitudinal direction. For example, in some implementations, the first bumper 338 and the second bumper 339 can be the same length.

As the pressurized fluid flows from the inlet 320 into the oscillator 330, a first portion of the fluid can flow into the first bypass tube 335, and a second portion of the fluid can flow into the second bypass tube 336. A third portion of the fluid can flow into the mixing chamber. As the first portion and the second portion flow through the first bypass tube 335 and the second bypass tube 336, respectively, a portion of each of the first portion and the second portion can flow around the first bumper 338 and the second bumper 339, respectively, and into the mixing chamber 337. In some implementations, each bumper can include a generally convex portion configured to assist in directing a flow from each respective bypass tube into the mixing chamber. This flow can cause alternating pressure differentials to build up on the first oscillation wall 333 and the second oscillation wall 334 in order to cause the flow of the fluid to oscillate. In this way, the oscillator 330 can be configured to receive the pressurized fluid (e.g., a high pressure fluid) from the inlet 320 generate an oscillating flow.

The outlet 340 can be configured to receive the flow of the oscillating fluid from the oscillator 330. The outlet 340 can include a first exit wall 341 proximate to the first bypass tube 335, and a second exit wall 342 proximate to the second bypass tube 336. The first and second exit walls 341/342 can together define a fourth throat $TH_4$ having a fourth width and an exit E. In some implementations, the outlet can narrow from the fourth throat $TH_4$ to the exit E.

The outlet 340 can be configured to receive the oscillating fluid and provide the oscillating fluid to a surface to delaminate debris from the surface. For example, the outlet 340 can be configured to eject the oscillating fluid onto the surface of a sensor 101 in order to delaminate debris from the sensor 101.

In some implementations, the outlet can include exit side walls 343 and 344, such as at a flared portion downstream of the exit E. For example, in some implementations, the flared portion can flare across an angle of approximately 60°.

Figure 4:
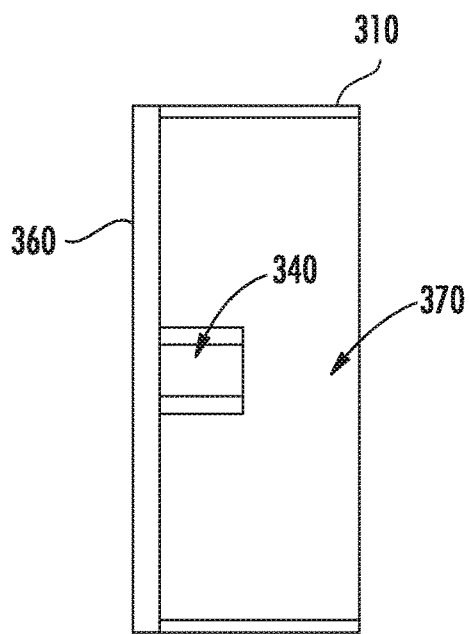
FIG. 4 depicts a side-view of an example nozzle according to example aspects of the present disclosure.

Referring now to FIG. 4, a side view of the example nozzle 300 of FIG. 3 is depicted. As shown, the nozzle 300 can include the baseplate 310 and a top 360. Also depicted is the outlet 340.

In some implementations, the baseplate 310 and/or top 360 can be manufactured out of a single piece of material. For example, in some implementations, the baseplate 310 and/or top 360 can be milled from a solid piece of material (e.g., aluminum, steel, plastic). For example, the inlet 320, bypass flow tubes 342/344, mixing chamber 346, and outlet 340 can be cut into a solid piece of material, thereby creating a floor 370 on the baseplate and the various fluid flow pathways of the nozzle 300. In some implementations, the baseplate 310 and/or top 360 can be manufactured by additive manufacturing, injection molding, or any other suitable process.

In some implementations, the top 360 can be manufactured out of the same or similar material as the baseplate 310, such as metal or plastic, and can be attached to the baseplate 310 in order to enclose the various chambers. The top 360 can be attached to the baseplate 310 in order to enclose the inlet 320, the oscillator 330, and the outlet 340. For example, in some implementations, the top 360 can be attached to the baseplate 310 via laser welding, ultrasonic welding, brazing, conventional welding, coupling via one or more fasteners (e.g., screws), or any other suitable method. In such fashion, the nozzle 300 can become essentially air and/or watertight, excepting the opening and the exit. In some implementations, the top 360 can be essentially parallel to the floor 370 of the baseplate 310.

Although FIGS. 3 and 4 depict the baseplate 310 and top 360 as separate pieces, one of ordinary skill in the art will recognize that in some implementations, the nozzle 300 can be manufactured such that the baseplate 310 and top 360 are constructed out of a single piece of material, such as via casting, injection molding, additive manufacturing, etc.

Figure 5:
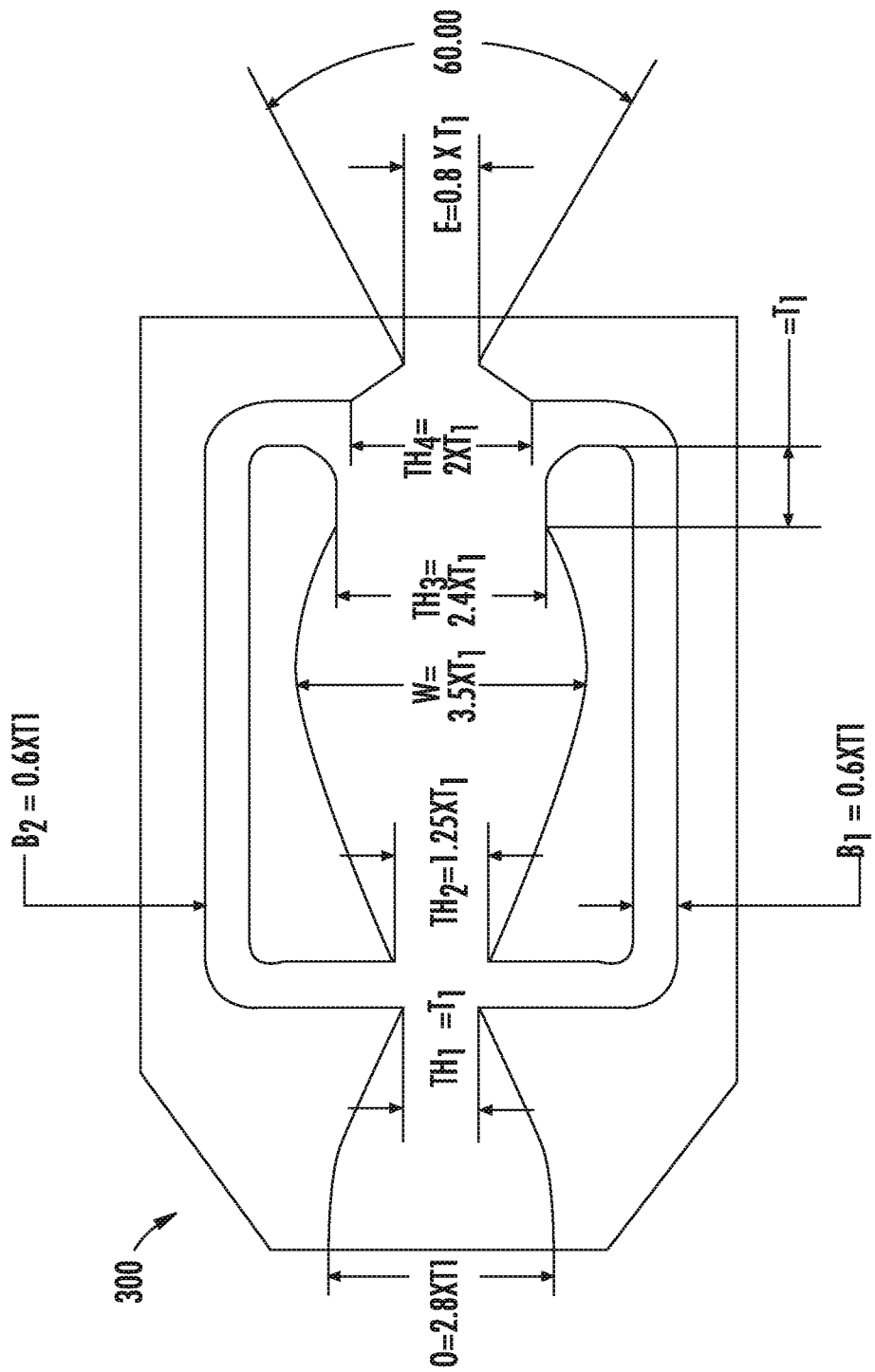
FIG. 5 depicts a top-view of an example nozzle according to example aspects of the present disclosure.

Referring now to FIG. 5, a nozzle 300 according to example aspects of the present disclosure is depicted. The nozzle 300 can be the same or similar nozzle 300 as depicted in FIG. 3. However, in some implementations as depicted in FIG. 5, the opening O, throats $TH_1$-$TH_4$, maximum Width W, bumper length $T_1$, bypass tube widths $B_1$ and $B_2$, and exit E can have various ratios to one another.

For example, in some implementations, the ratio of the first throat $TH_1$ to the bumper length $T_1$ of each oscillation wall 333/334 can be approximately 1.0. As used herein, the term approximately when used in reference to a ratio means within plus or minus 20% of the stated value. For example, the bumper length $T_1$ can be a specific width, and the width of the first throat $TH_1$ can be approximately the same width as the bumper length $T_1$.

In some implementations, the ratio of the width of the opening O to the width of the first throat $TH_1$ can be approximately 2.8. For example, the opening O of the inlet can be approximately 2.8 times wider than the width of the first throat $TH_1$. In some implementations, the ratio of the width of the opening O to the width of the first throat $TH_1$ can be within a range of 2.24 to 3.36.

In some implementations, the ratio of the width of the second throat $TH_2$ to the width of the first throat $TH_1$ can be approximately 1.25. For example, the second throat $TH_2$ in the oscillator can be approximately 1.25 times wider than the width of the first throat $TH_1$. Thus, the second throat $TH_2$ can be wider than the first throat $TH_1$, which can allow the flow of fluid to expand as it enters the second throat $TH_2$ from the first throat $TH_1$. In some implementations, the ratio of the width of the second throat $TH_2$ to the width of the first throat $TH_1$ can be within a range of 1.0 to 1.5.

In some implementations, the ratio of the width of the third throat $TH_3$ to the width of the first throat $TH_1$ can be approximately 2.4. For example, the third throat $TH_3$ can be approximately 2.4 times wider than the width of the first throat $TH_1$. In some implementations, the ratio of the width of the third throat $TH_3$ to the width of the first throat $TH_1$ can be within a range of 1.92 to 2.88.

In some implementations, the ratio of the width of the maximum width W of the mixing chamber to the first throat $TH_1$ can be approximately 3.5. For example, the maximum width W of the mixing chamber can be approximately 3.5 times wider than the width of the first throat $TH_1$. In some implementations, the ratio of the width of the maximum width W to the width of the first throat $TH_1$ can be within a range of 2.8 to 4.2.

In some implementations, the ratio of the width of the fourth throat $TH_4$ to the width of the first throat $TH_1$ can be approximately 2.0. For example, the fourth throat $TH_4$ in the oscillator can be approximately 2.0 times wider than the width of the first throat $TH_1$. In some implementations, the ratio of the width of the fourth throat $TH_4$ to the width of the first throat $TH_1$ can be within a range of 1.6 to 2.2.

In some implementations, the exit E of the outlet can be narrower than the first throat $TH_1$. For example, the ratio of the width of the exit E to the width of the first throat $TH_1$ can be approximately 0.8. In some implementations, the ratio of the width of the exit E to the width of the first throat $TH_1$ can be within a range of 0.64 to 0.96.

In some implementations, the ratio of the bypass width $B_1$ or $B_2$ to the width of the first throat $TH_1$ can be approximately 0.6. For example, the bypass width $B_1$ or $B_2$ of each bypass tube can be narrower than the first throat $TH_1$. In some implementations, the ratio of the bypass width $B_1$ or $B_2$ of each bypass tube to the width of the first throat $TH_1$ can be within a range of 0.48 to 0.72.

Figure 6:
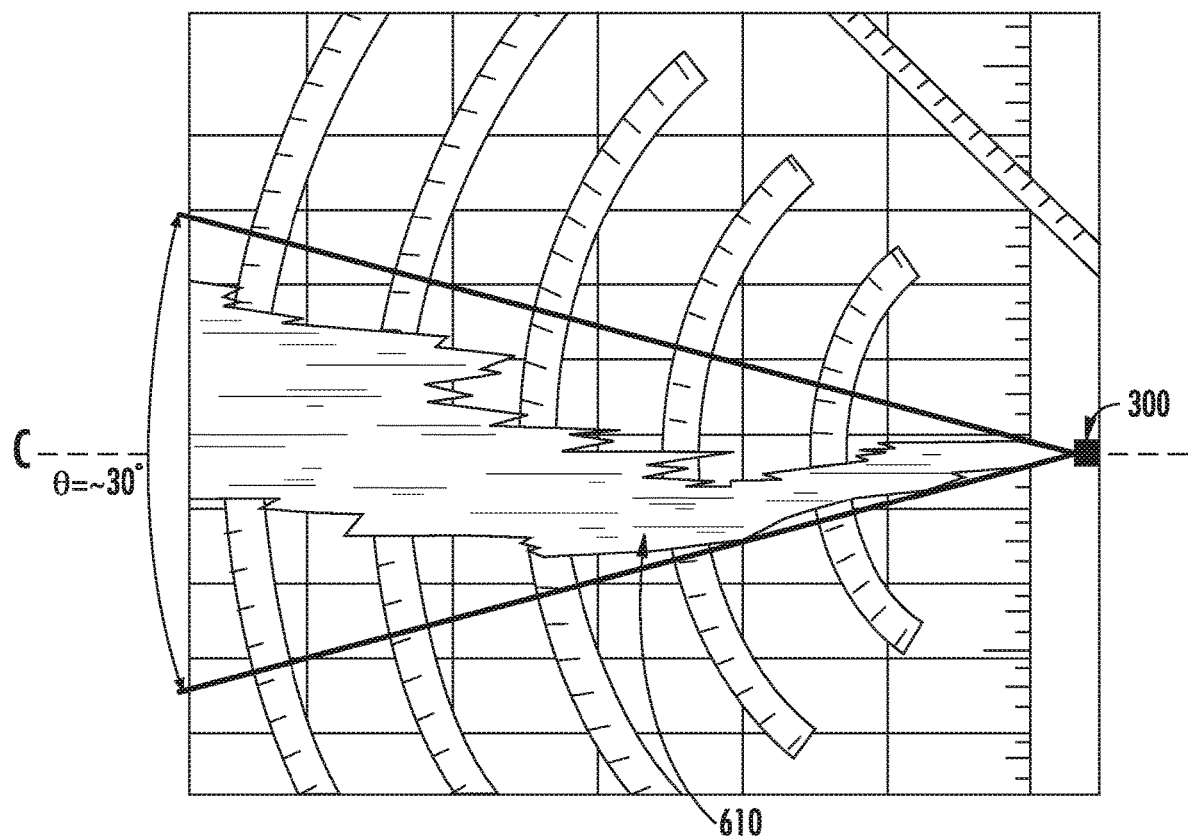
FIG. 6 depicts an example nozzle providing an oscillating spray according to example aspects of the present disclosure.

Referring now to FIG. 6, an example nozzle providing an oscillating spray according to example aspects of the present disclosure is depicted. For example, as the oscillating fluid exits the outlet 340 of a nozzle 300, an oscillating fluid 610 can be sprayed to, for example, delaminate debris from a surface.

In some implementations, the oscillating fluid 610 can oscillate at a frequency of approximately 100 Hz. For example, in some implementations, the oscillating fluid can oscillate at a frequency within a range of 80 Hz to 120 Hz.

The oscillating fluid can oscillate from side to side, and the sweeping motion can assist in delaminating debris from the surface. In some implementations, the oscillating fluid can oscillate across an oscillation angle θ of approximately 30°. For example, in some implementations, the oscillating fluid can oscillate within a range of 25° to 35°. For example, the longitudinal direction of the nozzle can correspond to a centerline C of oscillating fluid flow. The oscillating fluid 610 can oscillate from approximately 15° on one side of the centerline C to 15° on the opposite side of the centerline C, thus having an oscillation angle θ of approximately 30°. The flow of the oscillating fluid 610 can sweep from one side of the centerline C to the other side of the centerline, thus oscillating between the two sides.

Figure 7:
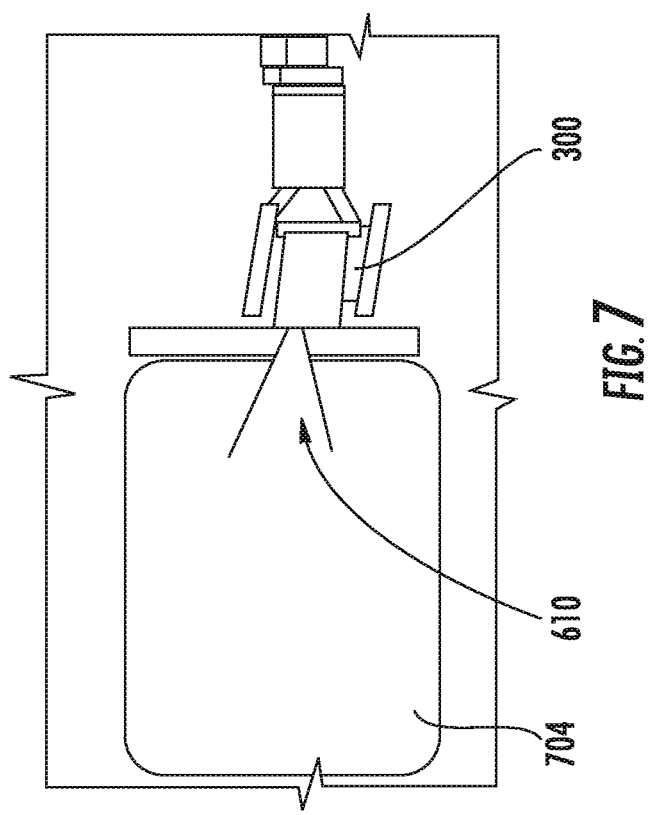
FIG. 7 depicts an example nozzle configured to clean the surface of a sensor according to example aspects of the present disclosure.
Figure 8:
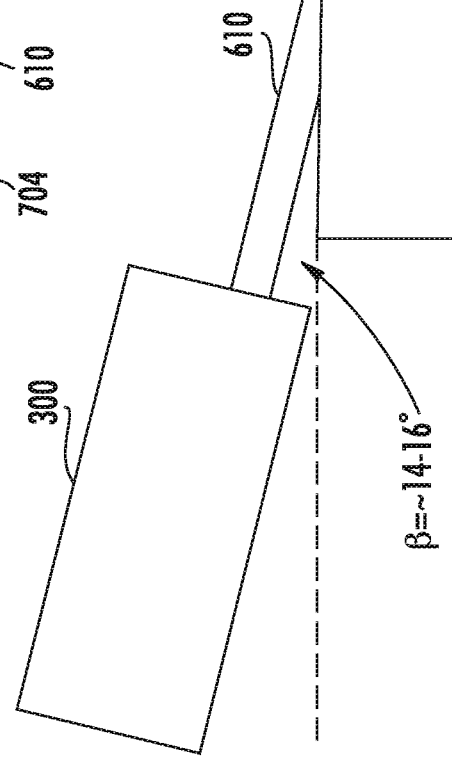
FIG. 8 depicts an example nozzle at an angle of inclination to a surface according to example aspects of the present disclosure.

Referring now to FIGS. 7 and 8, an example nozzle configured to clean the surface of a sensor according to example aspects of the present disclosure is depicted. For example, FIG. 7 depicts a perspective view of an example nozzle 300 cleaning a surface 704, while FIG. 8 depicts a side view of an example nozzle 300 cleaning a surface 704.

As shown, an oscillating fluid 610 can exit the outlet 340 of a nozzle 300 and be sprayed onto a surface 704. For example, the oscillating fluid 600 can be used to delaminate debris from the surface 704. In some implementations, the surface 704 can be a surface 704 of a sensor 101/232-236.

In some implementations, the nozzle 300 can be positioned at an angle of inclination β to a surface 704 of approximately 14-16°. For example, as shown in FIG. 8, a nozzle 300 is positioned at an angle of inclination β of approximately 15°. In other implementations, the nozzle 300 can be positioned at an angle of inclination β within a range of 9° to 21° to the surface 704. Positioning the nozzle 300 at an angle of inclination β, such as between 9° to 21°, can assist in delaminating debris from the surface, as the oscillating fluid 610 can accumulate and form a wave on the surface 704. As the wave of oscillating fluid 610 travels across the surface 704, debris deposited on the surface can be removed. For example, positioning the nozzle 300 at an angle of inclination of approximately β between 9° to 21° can allow for the oscillating fluid 610 to flow underneath debris to dislodge/delaminate the debris, while still having sufficient lateral momentum to carry the debris off of the surface.

Figure 9:
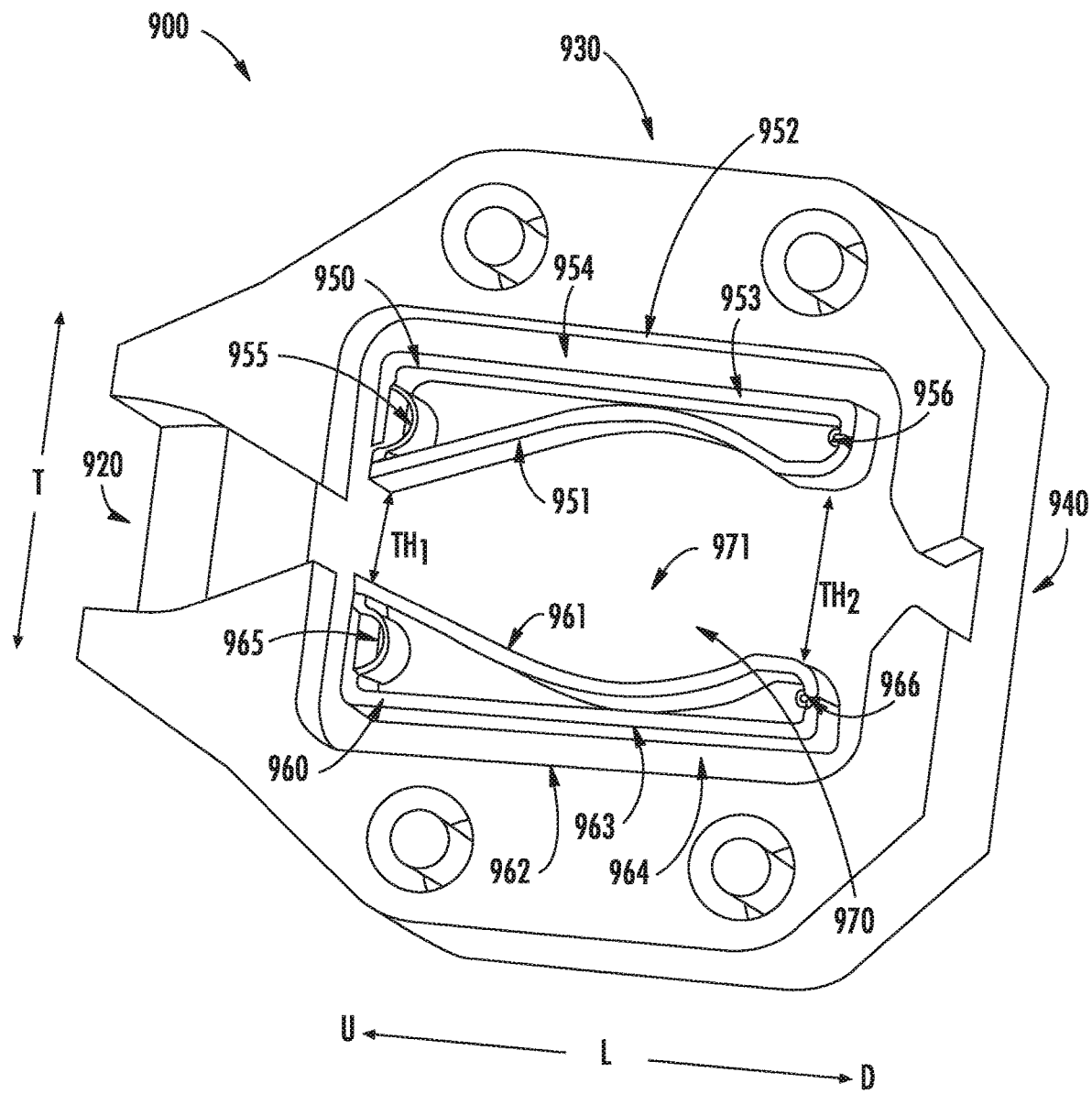
FIG. 9 depicts a perspective view of an example adjustable nozzle according to example aspects of the present disclosure.

Referring now to FIG. 9, a perspective view of an example adjustable nozzle 900 according to additional example aspects of the present disclosure is depicted. For example, in some implementations, an adjustable nozzle 900 can be used as a nozzle 222-226 in a cleaning system 200.

The adjustable nozzle 900 can include similar components as a nozzle 300, with a primary difference being that the adjustable nozzle 900 includes an adjustable oscillator 930. For example, an adjustable nozzle 900 can include an inlet 920. The inlet 920 can be configured to receive a pressurized fluid, such as pressurized air (e.g. compressed air) or pressurized liquid. In some implementations, the pressurized fluid can be a high-pressure fluid, such as a fluid at a pressure greater than 4.8 bar.

The adjustable oscillator 930 can be coupled with the inlet 920. For example, the adjustable oscillator 930 can be in fluid communication with the inlet 920 such that the pressurized fluid can flow from the inlet 920 into the adjustable oscillator 930. In this way, the adjustable oscillator can be configured to receive the pressurized fluid from the inlet 920. Further, the adjustable oscillator 930 can be configured to generate an oscillating fluid. The adjustable nozzle 900 can further include an outlet 940 coupled with the adjustable oscillator 930. The outlet 940 can be configured to receive the oscillating fluid and eject the oscillating fluid from the adjustable nozzle 900.

The adjustable oscillator 930 can be associated with a longitudinal direction L and a tangential direction T. The tangential direction T can be generally perpendicular to the longitudinal direction L. An upstream direction U can run parallel to the longitudinal direction L. Fluid can enter the inlet 920 at the upstream direction U, flow generally through the nozzle 900 along the longitudinal direction L, and exit the nozzle 900 via the outlet 940 at the downstream direction D. Thus, fluid can generally flow from the upstream direction U to the downstream direction D.

The adjustable oscillator 930 can include a first oscillation wall 950 and a second oscillation wall 960. The first oscillation wall 950 can include a first adjustable chamber modifier wall 951. Similarly, oscillation wall 960 can include a second adjustable chamber modifier wall 961. The first adjustable chamber modifier wall 951 and the second adjustable chamber modifier wall 961 can together define an adjustable mixing chamber 970. The adjustable mixing chamber 970 can be configured to generate the oscillating fluid, which can have one or more properties that are adjustable by the first adjustable chamber modifier wall 951 or the second adjustable chamber modifier wall 961. For example, in some implementations, the one or more properties of the oscillating fluid that the first adjustable chamber modifier wall 951 and/or the second adjustable chamber modifier wall 961 can be configured to adjust can include an oscillation frequency, an oscillation angle, or a direction of a flow of the oscillating fluid.

The adjustable oscillator 930 can further include a first sidewall 952 and a second side wall 962. The first oscillation wall 950 can also include a first bypass wall 953. Similarly, the second oscillation wall 960 can include a second bypass wall 963. The first bypass wall 953 and the first sidewall 952 can together define a first bypass tube 954, and the second bypass wall 963 and the second sidewall 962 can together define a second bypass tube 964. The first bypass tube 954 and the second bypass tube 964 can be similar to and have similar functionality as the first bypass tube 335 and second bypass tube 336, as depicted in FIG. 3. For example, a first portion of the flow of the pressurized fluid received the inlet 920 can flow into the first bypass tube 954, and a second portion of the pressurized fluid received at the inlet 920 can flow through the second bypass tube 964.

The first oscillation wall 950 can further include a first upstream flexure 955 at an upstream portion of the first oscillation wall 950 and a first downstream flexure 956 at a downstream portion of the first oscillation wall 950. Similarly, the second oscillation wall 960 can include a second upstream flexure 965 at an upstream portion of the second oscillation wall 960 and a second downstream flexure 966 at a downstream portion of the second oscillation wall 960. The first adjustable chamber modifier wall 951 can be connected to the first bypass wall 953 by the first upstream flexure 955 and the first downstream flexure 956. Similarly, the second adjustable chamber modifier wall 961 can be coupled to the second bypass wall 963 by the second upstream flexure 965 and the second downstream flexure 966. Each of the first upstream flexure 955, the first downstream flexure 956, the second upstream flexure 965, and the second downstream flexure 966 can be independently movable to adjust the adjustable mixing chamber. For example, in some implementations, the flexures 955/956/965/966 can be molded out of a flexible plastic, such as via an injection molding process. The first adjustable chamber modifier wall 951 and the second adjustable chamber modifier wall 961 can be disconnected from a floor 971 of the adjustable nozzle 930 such that the first adjustable chamber modifier wall 951 and the second adjustable chamber modifier wall 961 can move generally along the tangential direction T to adjust the adjustable mixing chamber 970.

For example, the first adjustable chamber modifier wall 951 and the second adjustable chamber modifier wall 961 can together define a first throat $TH_1$ at an upstream portion (i.e., upstream throat) of the adjustable oscillator 930 and a second throat $TH_2$ at a downstream portion (i.e., downstream throat) of the adjustable oscillator 930. The width of the first throat $TH_1$ and the width of the second throat $TH_2$ can be adjusted by moving the first adjustable chamber modifier wall 951 and second adjustable chamber modifier wall 961. For example, an upstream portion or a downstream portion of the first adjustable chamber modifier wall 951 can move generally along the tangential direction T to extend towards or retract away from the second adjustable chamber modifier wall 961, or vice-versa, in order to increase or decrease the adjustable mixing chamber 970. In this way, the adjustable mixing chamber 970 can be adjusted by the adjustable chamber modifier walls 951/961.

In some implementations, the adjustable nozzle 900 can be controlled by a controller, such as a controller 250. For example, a controller can be configured to control the independent movement of the first upstream flexure 955, the first downstream flexure 956, the second upstream flexure 965, and the second downstream flexure 966 in order to adjust the adjustable mixing chamber 970.

Figure 10:
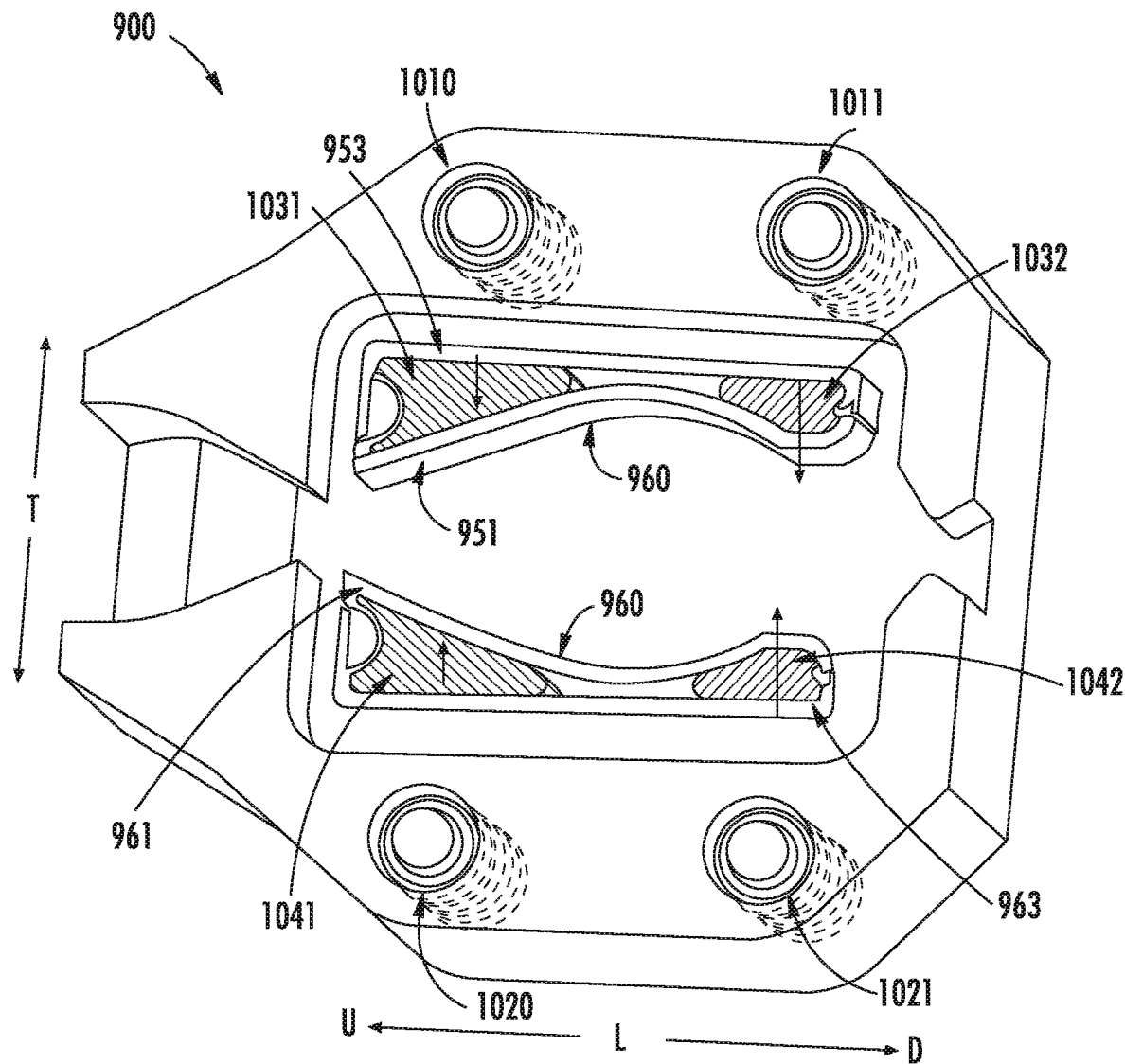
FIG. 10 depicts a perspective view of an example adjustable nozzle according to example aspects of the present disclosure.

For example, referring now to FIG. 10, an example controllable adjustable nozzle 900 according to additional example aspects of the present disclosure is depicted. FIG. 10 depicts the same adjustable nozzle 900 as FIG. 9, but includes additional details and components that will be discussed in greater detail below.

For example, in some implementations, an adjustable nozzle 900 can include one or more electromagnets configured to generate one or more electromagnetic fields. In some implementations, a controller, such as a controller 250, can be configured to control the one or more electromagnets to adjust the shape of the adjustable mixing chamber 970.

For example, in some implementations as shown in FIG. 10, an adjustable nozzle 900 can include a first upstream electromagnet 1010, a first downstream electromagnet 1011, a second upstream electromagnet 1020, and a second downstream electromagnet 1021. The electromagnets 1010/1011/1020/1021 can be, for example, coiled inductors, each of which can generate an electromagnetic field when a current is run through the coiled inductor. Similarly, other suitable electromagnets can be used.

In some implementations, the adjustable nozzle can include one or more magnetically controllable fluids. For example, in some implementations, the magnetically controllable fluid can be FerroFluid. Similarly, other magnetically controllable fluids can be used. In some implementations, the magnetically controllable fluid can be configured to react to the one or more electromagnetic fields generated by the one or more electromagnets to adjust the shape of the adjustable mixing chamber.

For example, in some implementations as shown in FIG. 10, the first bypass wall 953 and the first adjustable chamber modifier wall 951 can define a first cavity at an upstream portion (i.e. first upstream cavity) and a first cavity at a downstream portion (i.e., first downstream cavity) of the first oscillation wall 950. Similarly, the second bypass wall 963 and the first adjustable chamber modifier wall 961 can define a second cavity at an upstream portion (i.e. second upstream cavity) and a second cavity at a downstream portion (i.e., second downstream cavity) of the second oscillation wall 960.

In some implementations, a first upstream magnetically controllable fluid 1031 can be positioned in the first upstream cavity, a first downstream magnetically controllable fluid 1032 can be positioned in the first downstream cavity, a second upstream magnetically controllable fluid 1041 can be positioned in the second upstream cavity, and a second downstream magnetically controllable fluid 1042 can be positioned in the second downstream cavity, as depicted in FIG. 10.

In some implementations, the one or more magnetically controllable fluids can be controlled by one or more magnetic fields. For example, a magnetic field can cause the magnetically controllable fluid to align along the magnetic field flux lines. For example, the magnetically controllable fluids 1031/1032/1041/1042 positioned in their respective cavities can react to magnetic fields generated by the electromagnets 1010/1011/1020/1021. As the magnetically controllable fluids 1031/1032/1041/1042 align with the respective electromagnetic fields, the magnetically controllable fluids can exert a pressure on the respective flexures 955/956/965/966 and/or chamber modifier walls 951/961 to expand or contract the adjustable mixing chamber 970.

For example, in some implementations, the first upstream electromagnet 1010 can be configured to generate a first upstream electromagnetic field across the first upstream magnetically controllable fluid 1031, the first downstream electromagnet 1011 can be configured to generate a first downstream electromagnetic field across the first downstream magnetically controllable fluid 1032, the second upstream electromagnet 1020 can be configured to generate a second upstream electromagnetic field across the second upstream magnetically controllable fluid 1041, and the second downstream electromagnet 1021 can be configured to generate a second downstream electromagnetic field across the second downstream magnetically controllable fluid 1042. For example, as shown in FIG. 10, each of the electromagnets 1010/1011/1020/1021 are each positioned generally along the tangential direction from the respective magnetically controllable fluids 1031/1032/1041/1042 external from the adjustable mixing chamber 970. In some implementations, each of the electromagnets 1010/1011/1020/1021 can each be positioned outside of the first and second bypass tubes 954/964.

In some implementations, each of the electromagnets 1010/1011/1020/1021 can be controlled to generate a respective magnetic field. For example, a current can be run through each electromagnet 1010/1011/1020/1021 to generate a respective magnetic field. The magnetically controllable fluids 1031/1032/1041/1042 (e.g., FerroFluid) can react to the respective magnetic field by forming along the flux lines of the field. This, in turn, can cause the respective magnetically controllable fluid 1031/1032/1041/1042 to expand the flexures 955/956/965/966 in the respective location. For example, the first upstream magnetically controllable fluid 1031 can extend or contract generally along the tangential direction, thereby creating a force on the first upstream flexure 955, causing the upstream portion of the first adjustable chamber modifier wall 951 to extend or retract generally along the tangential direction, thereby narrowing or expanding the adjustable mixing chamber 970. Similarly, each respective magnetically controllable fluid 1031/1032/1041/1042 can react to a respective magnetic field generated by the respective electromagnet 1010/1011/1020/1021.

In some implementations, the first upstream electromagnet 1031 and the second upstream electromagnet 1041 can be configured to adjust a width and orientation of the upstream throat $TH_1$ by generating the first upstream electromagnetic field and the second upstream electromagnetic field, respectively. Similarly, the first downstream electromagnet 1032 and the second downstream electromagnet 1032 can be configured to adjust a width and orientation of the downstream throat $TH_2$ by generating the first downstream electromagnetic field and the second downstream electromagnetic field, respectively. In this way, the adjustable mixing chamber 270 can be finely controlled by controlling the electromagnetic fields generated by each of the electromagnets 1010/1011/1020/1021 in the adjustable nozzle 900.

In some implementations, the first upstream electromagnet 1010, the first downstream electromagnet 1011, the second upstream electromagnet 1020, and the second downstream electromagnet 1021 can be configured to be controlled by a controller, such as a controller 250, to induce the first upstream electromagnetic field, the second downstream electromagnetic field, the second upstream looked magnetic field, and the second downstream electromagnetic field, respectively. For example, the controller 250 can be configured to control a current provided to each of the electromagnets 1010/1011/1020/1021 independently. In this way, the controller 250 can be configured to control the movement of the adjustable chamber modifier walls 951/961 by controlling the current provided to the electromagnets 1010/1011/1020/1021.

By adjusting the size and configuration of the adjustable mixing chamber 970, several properties of the oscillating fluid generated by the adjustable nozzle 900 can be adjusted. For example, expanding and/or contracting the adjustable chamber modifier walls 951/961 can adjust the oscillation frequency, the oscillation angle, and/or the direction of the flow of the oscillating fluid. For example, adjusting the width and/or orientation of the first throat $TH_1$ and/or the width of the second throat $TH_2$ can, in some implementations, adjust the oscillation frequency, the oscillation angle, and/or the direction of flow of the oscillating fluid. For example, the oscillation frequency can be increased or decreased, the direction of flow can be directed from one side of the nozzle 900 to the other, and the oscillation angle θ can be widened or narrowed, as desired. In this way, the adjustable nozzle 900 can be finely controlled, such as by a controller, to adjust the one or more properties of the oscillating fluid generated by the adjustable nozzle 900.

The nozzles, devices, and systems of the present disclosure have been demonstrated to provide significant advantages over commercially available nozzles. For example, Table 1 compares the example nozzles according to example aspects of the present disclosure to two commercially available nozzles. All stated values are approximate.

For example, one advantage provided by the nozzles according to example aspects of the present disclosure as compared to conventional nozzles is that the nozzles provided herein can allow for a relatively straight flow path of fluid through the nozzles. For example, in some conventional nozzles, one or more posts may be included in an inlet region of the nozzle, which can cause a wider oscillation angle of the oscillating fluid ejected from the nozzle. Such posts, however, can impede the flow of fluid through the nozzle, and further can reduce the suitable pressure levels capable of generating an oscillating fluid. For example, two such commercially available nozzles are able to operate within a fluid pressure range of 0.7 bar to 1.4 bar (approximately 10-20 psi) for proper operation.

The relatively straight flow paths of the nozzles according to example aspects of the present disclosure, however, allow for higher pressure fluids to be provided to the nozzle, such as, for example, fluids at a pressure greater than 4.8 bar (approximately 70 psi). Further, higher pressure fluids can flow at higher velocities. This, in turn, can allow for the oscillating fluids generated by the nozzles disclosed herein to achieve significantly higher momentums per droplet than oscillating fluids generated by conventional nozzles. For example, as shown in Table 1, the oscillating fluid generated by the example nozzles disclosed herein achieved a momentum per droplet (kg*m/s) that was two to ten times higher than two commercially available nozzles.

Further, the nozzles and systems according to example aspects of the present disclosure can allow for oscillating fluid oscillate at approximately 100 Hz, as compared to conventional nozzles which typically oscillate in the range of 400 to 500 Hz. The slower oscillation frequency of oscillating fluid generated by nozzles according to example aspects of the present disclosure can allow for the oscillating fluid to build up on a surface as the fluid contacts the surface, which can aid in generating a wave of fluid to delaminate debris from the surface. For example, rather than generating an oscillating spray which merely wets a surface, the nozzles according to example aspects of the present disclosure can generate an oscillating fluid jet which sweeps from side to side across the oscillation angle to delaminate debris from the surface.

Additionally, the nozzles and systems according to example aspects of the present disclosure can allow for a narrower oscillation angle than is typically generated by conventional nozzles. For example, two commercially available nozzles had an oscillation angle of 60° or higher, as compared to the approximately 30° oscillation angle or variable oscillation angles generated by nozzles according to example aspects the present disclosure. These narrower oscillation angles can further aid in delaminating debris from a surface by, for example, focusing the oscillating fluid spray to a more confined area. Thus, the oscillating fluid generated by nozzles according to example aspects the present disclosure can direct more oscillating fluid to a particular area of a surface than conventional nozzles.

Additionally, the nozzles and systems according to example aspects of the present disclosure can allow for a reduced amount of fluid to be used to clean the surface of the sensor. For example, the increased momentum of the oscillating fluid as compared to conventional nozzles can allow for a rapid delamination of debris from the surface (e.g., in

TABLE 1

|  | Present Disclosure | Commercial 1 | Commercial 2 |
| --- | --- | --- | --- |
| Oscillation Angle | 30° | 60° | 65° |
| Oscillation Frequency | 100 Hz | 400-500 Hz | 400-500 Hz |
| Flow Momentum | $5.98 \times 10^{-4}$ kg * m/s | $5.48 \times 10^{-5}$ kg * m/s | $2.62 \times 10^{-5}$ kg * m/s |
| Flow Velocity | 51.11 mph | 33.32 mph | 53.14 mph |
| Flow Rate | 1.39 L/min | 1.08 L/min | 1.58 L/min |
| Pressure Range | Greater than 4.8 bar | 7.-1.4 bar | .7-1.4 bar |
| Behavior | Clean Oscillation | Wide Spray | Wide Spray | less than 500 ms). This can allow for very short duration sprays to be used in order to delaminate the debris. In some implementations, the nozzles and systems according to example aspects of the present disclosure can use approximately 75-80% less fluid than a conventional nozzle.

Moreover, the nozzles and systems according to example aspects of the present disclosure can allow for the efficient removal of debris from a sensor during operation of an autonomous vehicle, thereby enabling improved operation of the sensor. Improved performance of the sensor can lead to improved performance of the autonomous vehicle motion control, which relies upon data collected by the one or more sensors to comprehend the surrounding environment of the autonomous vehicle. Thus, the improved nozzles and cleaning systems of the present disclosure can directly improve autonomous vehicle performance such as efficiency, safety, and passenger comfort.

Further, in implementations in which an adjustable nozzle is used, the oscillation frequency, oscillation angle, and the direction of flow of the oscillating fluid can be adjusted to delaminate debris from a sensor. For example, in some operating conditions, a piece of debris may be particularly resistant to delamination from the surface, such as bug debris deposited on the surface at a high rate of speed. By adjusting the oscillation angle, oscillation frequency, or direction of flow of the oscillating fluid, a targeted and/or increased flow of fluid can be provided to the region of the surface in which the debris is located in order to delaminate the debris from the surface.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An adjustable nozzle, comprising:
    an inlet configured to receive a pressurized fluid;
    an adjustable oscillator in fluid communication with the inlet, the adjustable oscillator configured to receive the pressurized fluid from the inlet and generate an oscillating fluid, the adjustable oscillator comprising a first oscillation wall and a second oscillation wall, the first oscillation wall comprising a first adjustable chamber modifier wall, the second oscillation wall comprising a second adjustable chamber modifier wall, the first adjustable chamber modifier wall and the second adjustable chamber modifier wall together defining an adjustable mixing chamber configured to generate the oscillating fluid, the first adjustable chamber modifier wall and the second adjustable chamber modifier wall adjustable so as to adjust one or more properties of the oscillating fluid; and
    an outlet in fluid communication with the adjustable oscillator, the outlet configured to receive the oscillating fluid and eject the oscillating fluid from the adjustable nozzle.

2. The adjustable nozzle of claim 1, wherein the adjustable oscillator further comprises a first side wall and a second side wall;
    wherein the first oscillation wall further comprises a first bypass wall, the first bypass wall and the first side wall together defining a first bypass tube; and
    wherein the second oscillation wall further comprises a second bypass wall, the second bypass wall and the second side wall together defining a second bypass tube.

3. The adjustable nozzle of claim 2, wherein the adjustable oscillator defines a longitudinal direction, a tangential direction, an upstream direction and a downstream direction;
    wherein the first oscillation wall further comprises a first upstream flexure at an upstream portion of the first oscillation wall and a first downstream flexure at a downstream portion of the first oscillation wall;
    wherein the first adjustable chamber modifier wall is connected to the first bypass wall via the first upstream flexure and the first downstream flexure;
    wherein the second oscillation wall further comprises a second upstream flexure at an upstream portion of the second oscillation wall and a second downstream flexure at a downstream portion of the second oscillation wall;
    wherein the second adjustable chamber modifier wall is connected to the first bypass wall via the second upstream flexure and the second downstream flexure; and
    wherein the first upstream flexure, the first downstream flexure, the second upstream flexure, and the second downstream flexure are each independently movable to adjust the adjustable mixing chamber.

4. The adjustable nozzle of claim 3, wherein the independent movement of the first upstream flexure, the first downstream flexure, the second upstream flexure, and the second downstream flexure are each configured to be controlled by a controller to adjust the adjustable mixing chamber.

5. The adjustable nozzle of claim 4, wherein the adjustable nozzle comprises one or more electromagnets configured to generate one or more electromagnetic fields; and
    wherein the controller is configured to control the one or more electromagnetics to adjust the shape of the adjustable mixing chamber.

6. The adjustable nozzle of claim 5, wherein the adjustable nozzle comprises one or more magnetically controllable fluids;
    wherein the one or more magnetically controllable fluids are configured to react to the one or more electromagnetic fields generated by the one or more electromagnetics to adjust the shape of the adjustable mixing chamber.

7. The adjustable nozzle of claim 6, wherein the first bypass wall and the first chamber modifier wall together define a first upstream cavity at the upstream portion of the first oscillation wall and a first downstream cavity at the downstream portion of the first oscillation wall;

wherein second bypass wall and the second chamber modifier wall together define a second upstream cavity at the upstream portion of the second oscillation wall and a second downstream cavity at the downstream portion of the second oscillation wall; and wherein the one or more one or more magnetically controllable fluids comprise a first upstream magnetically controllable fluid positioned in the first upstream cavity, a first downstream magnetically controllable fluid positioned in the first downstream cavity, a second upstream magnetically controllable fluid positioned in the second upstream cavity, and a second downstream magnetically controllable fluid positioned in the second downstream cavity.

8. The adjustable nozzle of claim 7, wherein the one or more electromagnets comprise a first upstream electromagnet configured to generate a first upstream electromagnetic field across the first upstream magnetically controllable fluid, a first downstream electromagnet configured to generate a first downstream electromagnetic field across the first downstream magnetically controllable fluid, a second upstream electromagnet configured to generate a second upstream electromagnetic field across the second upstream magnetically controllable fluid, and a second downstream electromagnet configured to generate a second downstream electromagnetic field across the second downstream magnetically controllable fluid.

9. The adjustable nozzle of claim 8, wherein the first chamber modifier wall and the second chamber modifier wall together define an upstream throat along the tangential direction at an upstream portion of the adjustable mixing chamber and a downstream throat along the tangential direction at a downstream portion of the adjustable mixing chamber; and wherein the first upstream electromagnet and the second upstream electromagnet are configured to adjust a width and orientation of the upstream throat by generating the first upstream electromagnetic field and the second upstream electromagnetic field, respectively; and wherein the first downstream electromagnet and the second downstream electromagnet are configured to adjust a width and orientation of the downstream throat by generating the first downstream electromagnetic field and the second downstream electromagnetic field, respectively.

10. The adjustable nozzle of claim 1, wherein the one or more properties of the oscillating fluid comprise at least one of an oscillation frequency, an oscillation angle, and a direction of a flow of the oscillating fluid.

11. The adjustable nozzle of claim 1, wherein the pressurized fluid comprises a fluid at a pressure greater than 4.8 bar.

12. The adjustable nozzle of claim 1, wherein the adjustable nozzle is configured to eject the oscillating fluid onto a surface of a sensor of an autonomous vehicle to delaminate debris from the surface.

13. A cleaning system, comprising:
a source of pressurized fluid; and
an adjustable nozzle, comprising:
an inlet configured to receive the pressurized fluid;
an adjustable oscillator in fluid communication with the inlet, the adjustable oscillator configured to receive the pressurized fluid from the inlet and generate an oscillating fluid, the oscillator comprising a first oscillation wall and a second oscillation wall, the first oscillation wall comprising a first adjustable chamber modifier wall, the second oscillation wall comprising a second adjustable chamber modifier wall, the first adjustable chamber modifier wall and the second adjustable chamber modifier wall together defining an adjustable mixing chamber configured to generate the oscillating fluid, the first adjustable chamber modifier wall and the second adjustable chamber modifier wall configured to adjust one or more properties of the oscillating fluid; and an outlet in fluid communication with the oscillator, the outlet configured to receive the oscillating fluid and eject the oscillating fluid from the adjustable nozzle.

14. The cleaning system of claim 13, further comprising:
a controller configured to control the first adjustable chamber modifier wall and the second adjustable chamber modifier wall to adjust the one or more properties of the oscillating fluid.

15. The cleaning system of claim 14, wherein the one or more properties comprise at least one of an oscillation frequency, an oscillation angle, and a direction of a flow of the oscillating fluid.

16. The cleaning system of claim 14, wherein the adjustable oscillator further comprises a first side wall and a second side wall;

wherein the first oscillation wall further comprises a first bypass wall, a first upstream flexure at an upstream portion of the first oscillation wall, and a first downstream flexure at a downstream portion of the first oscillation wall, the first bypass wall and the first side wall together defining a first bypass tube;

wherein the first adjustable chamber modifier wall is connected to the first bypass wall via the first upstream flexure and the first downstream flexure;

wherein the second oscillation wall further comprises a second bypass wall, a second upstream flexure at an upstream portion of the second oscillation wall, and a second downstream flexure at a downstream portion of the second oscillation wall, the second bypass wall and the second side wall together defining a second bypass tube;

wherein the second adjustable chamber modifier wall is connected to the first bypass wall via the second upstream flexure and the second downstream flexure;

wherein the first upstream flexure, the first downstream flexure, the second upstream flexure, and the second downstream flexure are each independently movable to adjust the adjustable mixing chamber; and wherein the controller is configured to control the independent movement of the first upstream flexure, the first downstream flexure, the second upstream flexure, and the second downstream flexure to adjust the adjustable mixing chamber.

17. The cleaning system of claim 16, wherein the adjustable nozzle comprises one or more electromagnets configured to generate one or more electromagnetic fields; and wherein the controller is configured to control the one or more electromagnetics to adjust the shape of the adjustable mixing chamber.

18. The cleaning system of claim 17, wherein the adjustable nozzle comprises one or more magnetically controllable fluids;

wherein the one or more magnetically controllable fluids are configured to react to the one or more electromagnetic fields generated by the one or more electromagnetics to adjust the shape of the adjustable mixing chamber.

19. The cleaning system of claim 18, wherein the first bypass wall and the first chamber modifier wall together define a first upstream cavity at the upstream portion of the first oscillation wall and a first downstream cavity at the downstream portion of the first oscillation wall;
  wherein second bypass wall and the second chamber modifier wall together define a second upstream cavity at the upstream portion of the second oscillation wall and a second downstream cavity at the downstream portion of the second oscillation wall;
  wherein the one or more one or more magnetically controllable fluids comprise a first upstream magnetically controllable fluid positioned in the first upstream cavity, a first downstream magnetically controllable fluid positioned in the first downstream cavity, a second upstream magnetically controllable fluid positioned in the second upstream cavity, and a second downstream magnetically controllable fluid positioned in the second downstream cavity; and
  wherein the one or more electromagnets comprise a first upstream electromagnet configured to generate a first upstream electromagnetic field across the first upstream magnetically controllable fluid, a first downstream electromagnet configured to generate a first downstream electromagnetic field across the first downstream magnetically controllable fluid, a second upstream electromagnet configured to generate a second upstream electromagnetic field across the second upstream magnetically controllable fluid, and a second downstream electromagnet configured to generate a second downstream electromagnetic field across the second downstream magnetically controllable fluid.

20. An autonomous vehicle, comprising:
a sensor comprising a surface; and
a cleaning system, comprising:
  a source of high pressure fluid;
  a controller; and
  an adjustable nozzle, comprising:
    an inlet configured to receive the pressurized fluid;
    an adjustable oscillator in fluid communication with the inlet, the adjustable oscillator configured to receive the pressurized fluid from the inlet and generate an oscillating fluid, the oscillator comprising a first oscillation wall and a second oscillation wall, the first oscillation wall comprising a first adjustable chamber modifier wall, the second oscillation wall comprising a second adjustable chamber modifier wall, the first adjustable chamber modifier wall and the second adjustable chamber modifier wall together defining an adjustable mixing chamber configured to generate the oscillating fluid, the first adjustable chamber modifier wall and the second adjustable chamber modifier wall configured to adjust one or more properties of the oscillating fluid; and
    an outlet in fluid communication with the oscillator, the outlet configured to receive the oscillating fluid and eject the oscillating fluid from the adjustable nozzle;
wherein the one or more properties comprise one or more of an oscillation frequency, an oscillation angle, and a direction of a flow of the oscillating fluid; and
wherein the controller is configured to control the adjustable nozzle to eject the oscillating fluid onto the surface to delaminate debris from the surface.

* * * * *